(12) United States Patent
Cartey et al.

(10) Patent No.: US 9,372,670 B1
(45) Date of Patent: Jun. 21, 2016

(54) TEMPLATE DEPENDENCY RELOCATION

(71) Applicant: SEMMLE LIMITED, Oxford (GB)

(72) Inventors: Luke James Cartey, Oxford (GB); Joshua George Hale, Oxford (GB); Geoffrey White, Oxford (GB)

(73) Assignee: Semmle Limited

( * ) Notice: Subject to any disclaimer, the term of this patent is extended or adjusted under 35 U.S.C. 154(b) by 0 days.

(21) Appl. No.: 14/871,813

(22) Filed: Sep. 30, 2015

Related U.S. Application Data

(60) Provisional application No. 62/234,939, filed on Sep. 30, 2015.

(51) Int. Cl.
  *G06F 9/44* (2006.01)
  *G06F 9/46* (2006.01)
  *G06F 11/36* (2006.01)

(52) U.S. Cl.
  CPC .............. *G06F 8/22* (2013.01); *G06F 11/3604* (2013.01)

(58) Field of Classification Search
  CPC ............... G06F 8/65; G06F 8/71; G06F 8/41; G06F 8/43; G06F 8/22; G06F 8/355; G06F 8/34; G06F 8/20; G06Q 10/06
  See application file for complete search history.

(56) References Cited

U.S. PATENT DOCUMENTS

| | | | |
|---|---|---|---|
| 5,692,184 A | 11/1997 | Ardoin et al. | |
| 7,409,679 B2 | 8/2008 | Chedgey et al. | |
| 7,680,818 B1 | 3/2010 | Fan et al. | |
| 7,810,079 B2 | 10/2010 | Cates | |
| 7,945,892 B1 * | 5/2011 | Kainz | G06T 17/005 345/440 |
| 8,090,754 B2 * | 1/2012 | Schmidt | G06F 17/30595 707/726 |
| 8,250,557 B2 * | 8/2012 | Mitran | G06F 8/445 717/144 |
| 8,392,760 B2 * | 3/2013 | Kandula | G06F 11/0709 714/25 |
| 8,631,387 B2 * | 1/2014 | Henderson | G06F 8/24 717/108 |
| 8,751,283 B2 * | 6/2014 | Bobak | G06Q 10/06 705/301 |
| 8,823,709 B2 | 9/2014 | Grandhi et al. | |
| 2009/0210750 A1 | 8/2009 | Cates | |
| 2010/0083230 A1 | 4/2010 | Ramakrishnan | |
| 2012/0151419 A1 | 6/2012 | Kent et al. | |
| 2012/0272228 A1 | 10/2012 | Marndi et al. | |

(Continued)

OTHER PUBLICATIONS de Moor et al., .QL: Object-Oriented Queries Made Easy, 2008, 56 pages.*

(Continued)

*Primary Examiner* — Thuy Dao
(74) *Attorney, Agent, or Firm* — Fish & Richardson P.C.

(57) ABSTRACT

Methods, systems, and apparatus, including computer programs encoded on computer storage media, for relocating template dependencies. One of the methods includes determining that dependencies in a dependency graph include a first dependency of a first node representing the first software element that includes a usage of a template parameterized by a type on a second node representing a second software element that is or occurs within a definition of the template, and a second dependency of the second node representing second software element on a third node representing the third software element that defines the type. In response, the dependency graph is modified including generating a new node in the dependency graph, the new node representing the instantiation of the template with the type, adding a new first dependency from the first node to the new node, and adding a new second dependency from the new node to the third node.

30 Claims, 27 Drawing Sheets

(56) References Cited

U.S. PATENT DOCUMENTS

2014/0019949 A1* 1/2014 Craymer ................ G06F 8/443 717/150
2015/0020048 A1* 1/2015 Misra ........................ G06F 8/74 717/120

OTHER PUBLICATIONS

Kanemitsu et al., A visualization method of program dependency graph for identifying extract method opportunity, May 2011, 7 pages.*

Wu et al., Comprehending module dependencies and sharing, Apr. 2010, 10 pages.*

Lungu et al., Recovering inter-project dependencies in software ecosystems, Sep. 2010, 4 pages.* de Moor et al., "Keynote Address: .QL for Source Code Analysis," Seventh IEEE International Working Conference on Source Code Analysis and Manipulation, Paris, France, Sep. 30, 2007-Oct. 1, 2007, 12 pages.

* cited by examiner

Explorer

- Users
  - tmp
    - even-or-odd
      - even.c
      - even.h
      - main.c
      - odd.c
      - odd.h
- usr

Architecture | Dependency | Tangle | Focus | Cycle | Clustering | Source Code even.c /Users/tmp/even-or-odd/even.c

```
1   #include <stdio.h>
2   #include "odd.h"
3
4   int even (int x) {
5       if (x == 0)
6           return 1;
7       if (x > 0)
8           return odd(x-1);
9       else
10          return odd(x+1) ;
11                    ~642
12  }
13
```

~640

Dependency Details | Aggregated Dependency Details | Explanation | Rules even.c depends on odd.c:

| Dependency origin | Line no. ~630 | Dependency target |
|---|---|---|
| ○ definition of even(int x) | 10 | ○ definition of odd(int x) |
| ○ definition of even(int x) | 8 | ○ definition of odd(int x) |

FIG. 6G

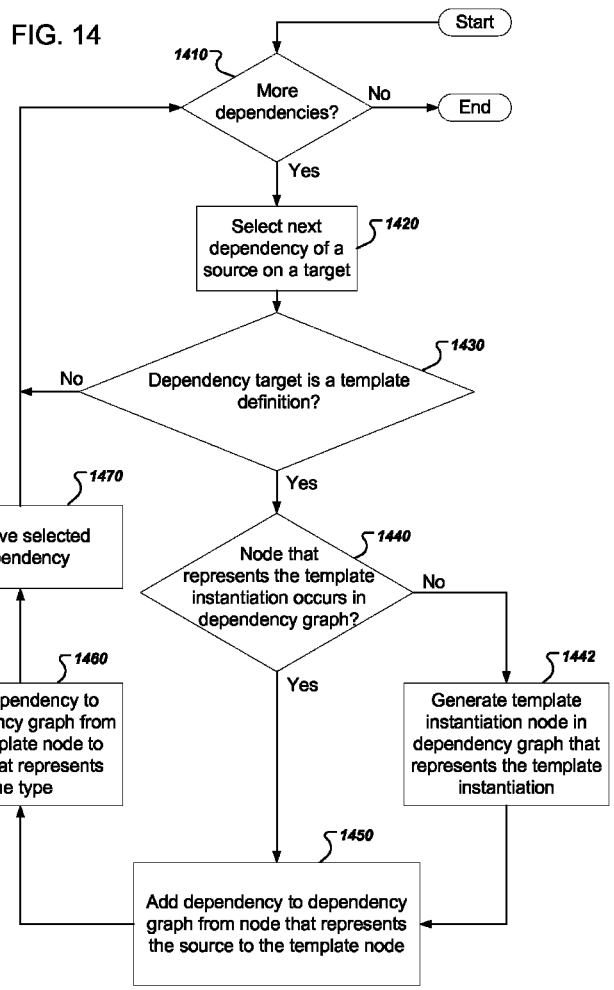

TEMPLATE DEPENDENCY RELOCATION

CROSS REFERENCE TO RELATED APPLICATIONS

This application claims the benefit under 35 U.S.C. §119(e) of the filing date of U.S. Provisional Patent Application No. 62/234,939, filed on Sep. 30, 2015, entitled "Hierarchical Dependency Analysis of Source Code," the entirety of which is herein incorporated by reference.

BACKGROUND

This specification relates to static analysis of computer software source code.

Static analysis refers to techniques for analyzing computer software source code without executing the source code as a computer software program.

Source code is typically maintained by developers in a code base, which may be referred to as a project. Developers can maintain the source code of the project using a version control system. Version control systems generally maintain multiple revisions of the source code in the code base, each revision being referred to as a snapshot. Each snapshot includes the source code of files of the code base as the files existed at a particular point in time.

Cyclic dependencies are a common problem in large code bases. A cyclic dependency occurs, for example, when a first software package depends on a second software package, the second software package depends on a third software package, and the third software package depends on the first software package. Cyclic dependencies make code bases harder to maintain because a change to any one software package in the cycle can require changes to each and every other software package in the cycle.

Dependencies in source code can be represented as a directed graph. However, as code bases become larger and larger, visualizations of the raw dependencies between source code elements, which can number many millions in large code bases, tend to be less useful.

SUMMARY

This specification describes how a static analysis system can generate aggregated dependencies among software elements in a code base. The system can use the aggregated dependencies to generate interactive user interface presentations for visualizing the structure and cyclic dependencies in a code base.

Particular embodiments of the subject matter described in this specification can be implemented so as to realize one or more of the following advantages. Users can gain an intuitive understanding of the structure and function of a complex software system by browsing interactive visualizations of an aggregated dependency graph. The interactive visualizations allow users to interactively explore complex software systems. The interactive visualizations help users to identify the causes of unnecessary complexity in software systems, and to develop solutions for reducing that complexity. The intuitive interactive visualizations can be integrated into existing coding tools to provide immediate and intuitive guidance on the design of a complex software system as the system is being built. The aggregated dependency information provides users with an intuitive sense for how hard it would be to remove or rearrange certain dependencies from the code base. The computation of aggregated dependencies allows users to create model architectures with associated rules that help developers modify a code base toward the model architecture.

A static analysis system can provide highly customizable definitions of dependencies by using queries to define the dependencies. Using queries to define dependencies provides a natural mechanism for rich dependency categorization. In addition, using queries is typically faster and clearer than specifying dependencies using a general purpose programming language. Furthermore, using queries makes the system easier to update or extend to support new language features. The rich categorization of dependencies can be used in an interactive presentation of aggregated dependencies. For example, different categories of dependencies can be visually distinguished in the presentation. Furthermore, some categories of queries can be turned on or off. A dependency analysis query can operate over a full program database, which can contain the entire program. Thus it is possible to perform global dependency analysis.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 6A-6L illustrate example user interface presentations of aggregated dependency graphs.
FIG. 14 is a flow chart of an example process for generating template instantiation nodes.

Like reference numbers and designations in the various drawings indicate like elements.

DETAILED DESCRIPTION

This specification describes static analysis techniques for generating visualizations of aggregated dependencies between software elements in a project. Large code bases can include millions of software elements and millions of corresponding dependencies between software elements. Therefore, it is often impractical for a static analysis system to present visualizations of raw dependencies in the code base.

Instead, a static analysis system can aggregate dependencies between software elements and present visualizations of the aggregated dependencies. An aggregated dependency between software elements merges information from two different types of relationships between software elements: (1) dependency relationships and (2) hierarchical relationships. The visualizations of the aggregated dependencies assist a user in understanding the structure of the code base without overwhelming the user with raw dependency information.

In this specification, the term "software element" refers broadly to any discrete part of a software system. A software element may be a source code element, e.g., a variable, function, class, or type. Software elements may also be build system elements, including files, directories, libraries, and packages. The definition of what software elements exist in a project is flexible. The software elements that are defined to exist in a project can thus vary according to different programming languages, different build systems, and different user-supplied definitions of software elements.

Figure 1A:
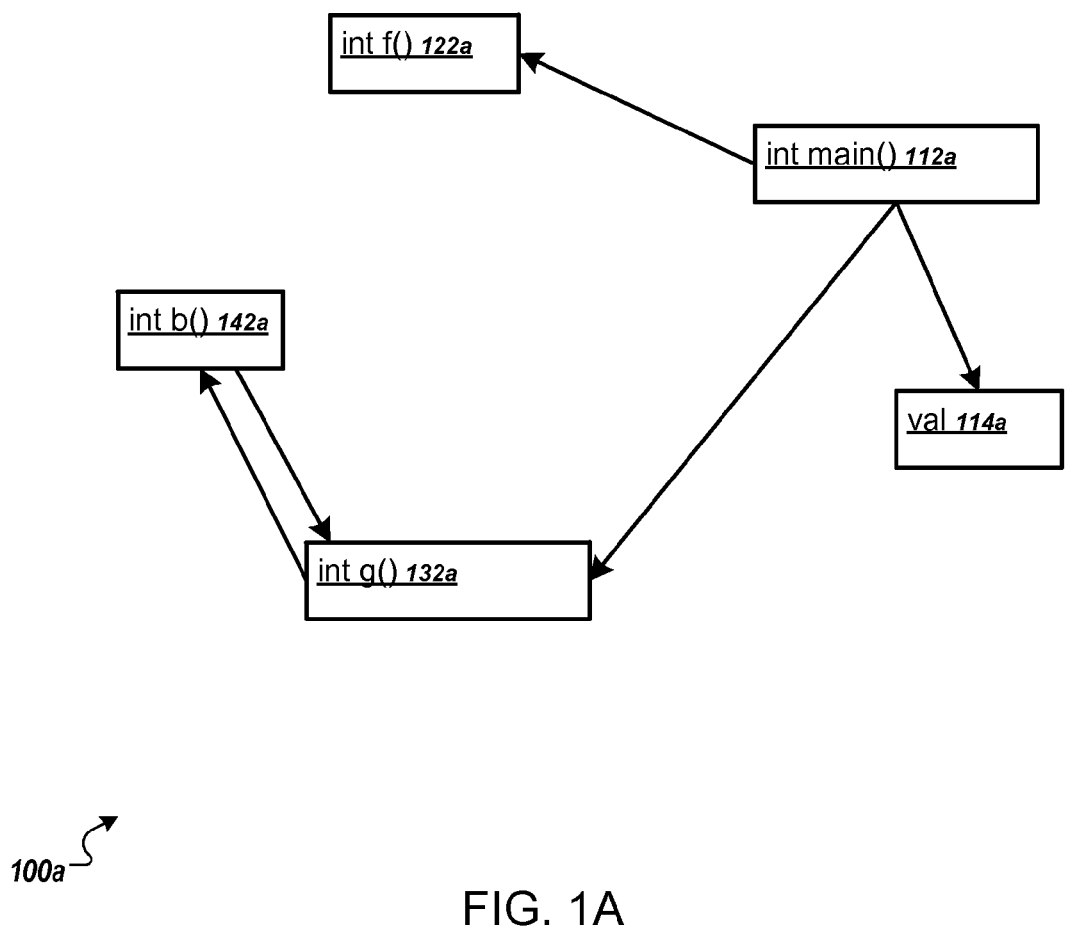
FIG. 1A illustrates an example dependency graph

FIG. 1A illustrates an example dependency graph 100a. The dependency graph 100a represents dependency relationships in a highly simplified example project. Even in this highly simplified example, the dependency graph 100a can appear quite complex.

The example project includes the following source code files, main.c, f.h, f.c, g.h, g.c, a.h, and a.c.

The main.c source code file includes the following source code:
include f.h
include g.h
const int val=2;
int main( ) {
int y=g(val)+f(1)
printf(y)
}

The f.h source code file includes the following source code:
int f(int z);

The f.c source code file includes the following source code:
int f(int z) {
return z+1
}

The g.h source code file includes the following source code:
int g(int a);

The g.c source code file includes the following source code:
int g(int a) {
return b(a)+1
}

The a.h source code file includes the following source code:
int b(int e);

The a.c source code file includes the following source code:
include g.h
int b(e) {
return g(e)+1
}

A dependency relationship, or for brevity, a "dependency" or a "software dependency" represents a functional relationship between two software elements. A dependency can be described as representing that one software element depends on another software element. Thus, a software element A can be considered to depend on a software element B when the software element A functions as intended only if the software element B is also available. For example, a source code file may not compile correctly if a header included by the source code file is not available.

In FIG. 1A, for example, an "int main( )" node 112a that represents the function "main( )" in main.c depends on a "val" node 114a that represents the variable "val" in main.c.

The "int main( )" node 112a also depends on an "int f( )" node 122a representing the function "int f( )" that is called from the function "int main( ). The "int main( )" node 112a also depends on an "int g( )" node 132a representing the function "int g( )" called from the function "int main( )" in main.c.

The "int g( )" node 132a depends on an "int b( )" node 142a that represents the function "int b( )" called from the function "int g( )." Similarly, The "int b( )" node 142a depends on an "int g( )" node 132a that represents the function "int g( )" called from the function "int b( )."

The definition of which software elements depend on which other software elements is flexible. The dependency relationships in a project can thus vary according to different programming languages, different build systems, and different user-supplied definitions of dependencies. For example, some programming languages are interpreted rather than compiled. Thus, dependences in interpreted programming languages represent run-time dependencies rather than compile-time dependencies.

The dependency relationships may be collectively referred to as a raw dependency graph. The term "raw dependency graph" is intended to distinguish the dependency relationships from aggregated dependencies, which may be collectively referred to or visualized as an aggregated dependency graph. The raw dependency graph and the aggregated dependency graph are both directed graphs that can include cycles.

Figure 1B:
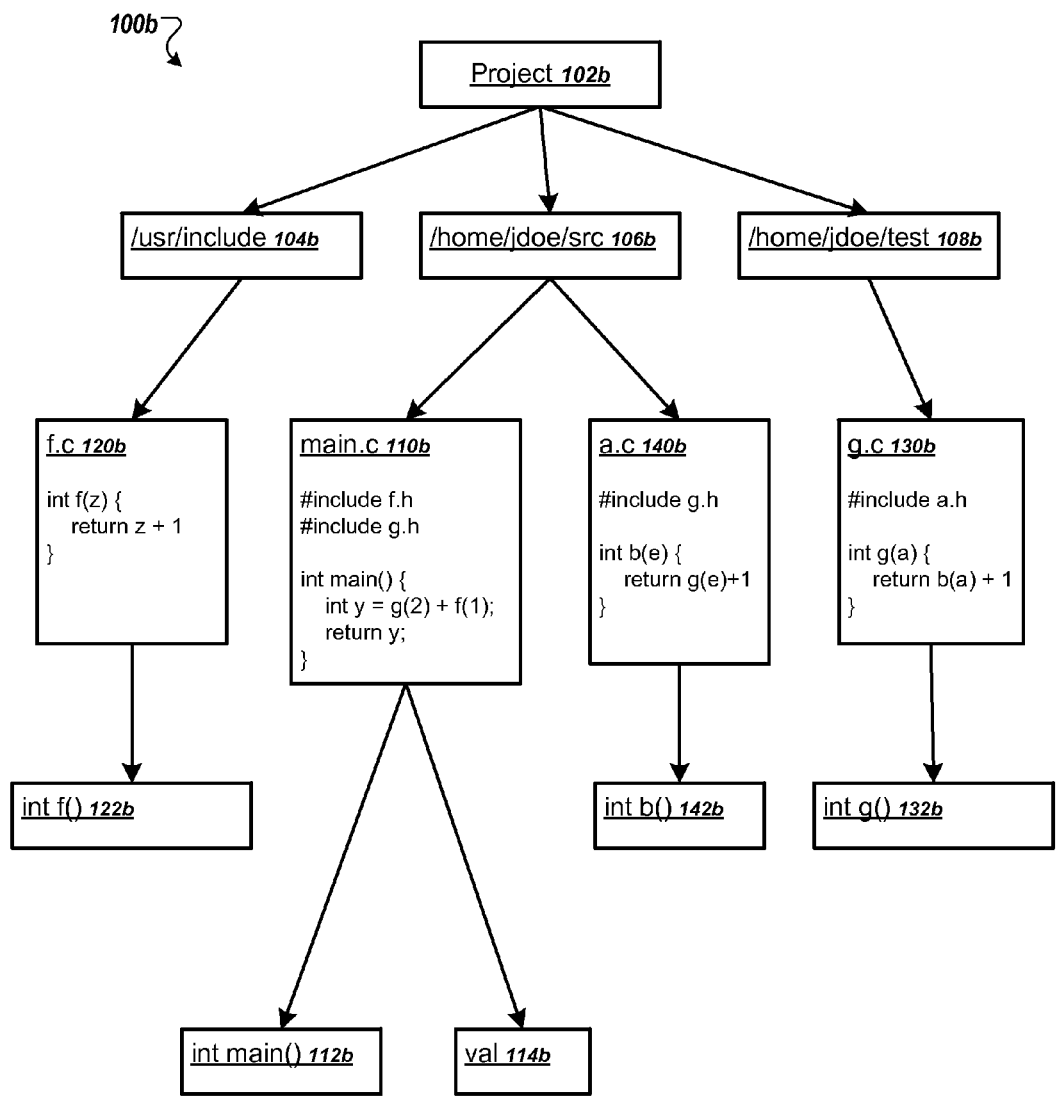
FIG. 1B illustrates an example hierarchy graph.

FIG. 1B illustrates an example hierarchy graph 100b. The hierarchy graph 100b represents hierarchical relationships in the example project of FIG. 1A.

A hierarchical relationship typically represents a containment relationship between software elements. For example, a hierarchical relationship can represent that a variable is contained in a function, that a function is contained in a class, that a class is contained in a file, that the file is contained in a directory, and that a directory is contained in the project, to name just a few examples. Each hierarchical relationship defines a parent element and a child element. Thus, a software element A is a parent element of a software element B when the software element B is contained in the software element A. Likewise, the software element B is a child element of software element A when the software element B is contained in the software element A.

In FIG. 1B, for example, an "int f( )" node 122b is a child element of the "f.c" node 120b because the definition of the function "f( )" is contained in the file f.c. Similarly, the "y" node 114b is a child element of the "int main( )" node 112b, which is a child element of the "main.c" node 110b. The "int g( )" node 132b, is a child element of the "g.c" node 130b. And the "int b( )" node 142b is a child element of the "a.c" node 140b. For simplicity, the header files of the example project are not illustrated in the example hierarchy graph 100b.

The hierarchy graph 100b also includes software element nodes representing file system constructs. For example, a "/usr/include" node 104b represents the directory "/usr/include," a "/home/jdoe/src" node 106b represents the directory "/home/jdoe/src," and a "/home/jdoe/test" node 108b represents the directory "/home/jdoe/test." A root node of the hierarchy, project node 102b, represents the entire example project.

Thus, the "f.c" node 120*b* is a child element of the "/usr/include" node 104*b* because the source code file f.h is contained in the directory "/usr/include." Similarly, the "main.c" node 110*b* and the "a.h" node 140*b* are child elements of the "/home/jdoe/src" node 106*b* because the source code files main.c and a.h are contained in the directory "/home/jdoe/src." And the "g.h" node 130*b* is a child element of the "/home/jdoe/test" node 108*b* because the source code file g.h is contained in the directory "/home/jdoe/test." The three directory nodes 104*b*, 106*b*, and 108*b*, are child elements of the project node 102*b* because the directories are contained in the project.

Although hierarchical relationships generally represent containment, the definition of the hierarchy is flexible. The definition of the hierarchy can vary according to different programming languages, different build systems, and different user-supplied definitions, which can correspond to business units, geographic locations, security policies, or areas of responsibility. In addition, in some implementations the hierarchy can also be interactively manipulated by a user.

The hierarchical relationships may be collectively referred to or visualized as a hierarchy graph, or for brevity, a hierarchy. When represented as a graph, each node of the hierarchy represents a software element and each software element has a link with one or more other software elements. The links in the hierarchy can be directed links that represent parent or child relationships. The hierarchy may have one type of link representing a parent relationship or a child relationship, or alternatively, the hierarchy may have two types of links representing parent and child relationships respectively.

Typically, the hierarchy includes a superset of the nodes that are in the raw dependency graph. In other words, the hierarchy includes all software elements represented by the dependency graph in addition to other software elements. For example, the hierarchy 100*b* has nodes that represent all of the software elements represented by the nodes in the raw dependency graph 100*a*. This is because the hierarchy represents containment relationships while the dependency graph represents functional relationships. Thus, even software elements that are not functionally related to any other software elements will still be included in the hierarchy.

The hierarchy can often be represented as a tree with a root node representing the project. However, a tree structure is not necessary. In other words, the hierarchy can be represented by any appropriate acyclic, directed graph that defines parent and child relationships between nodes. Some hierarchies may have multiple root nodes representing multiple projects being analyzed, and some nodes in the hierarchy may be reachable by multiple paths in the hierarchy.

Figure 1C:
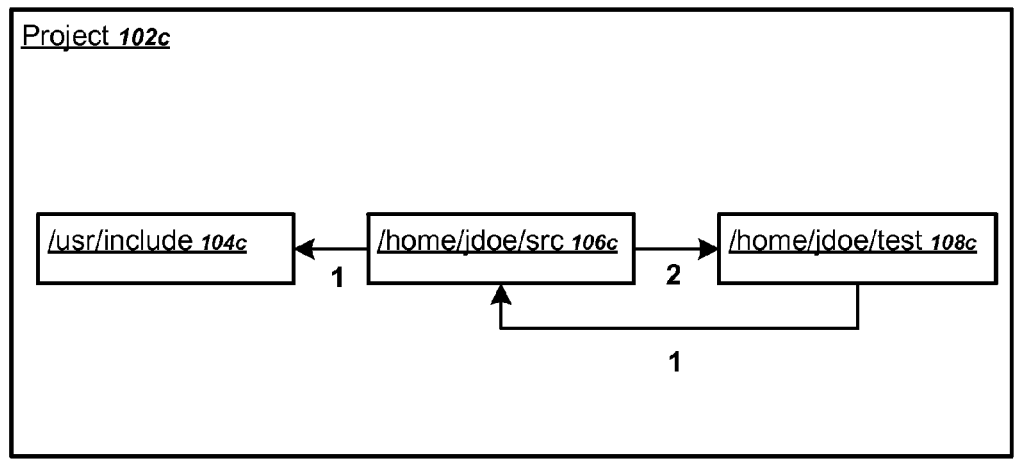
FIG. 1C illustrates an aggregated dependency graph.

FIG. 1C illustrates an aggregated dependency graph 100*c*. From the dependency relationships and the hierarchical relationships, a system can generate aggregated dependency relationships, or for brevity, aggregated dependencies. In general, an aggregated dependency exists between a software element A and a software element B when the software element A, or any descendent in the hierarchy of the software element A, has a dependency relationship with the software element B or with any descendent in hierarchy of the software element B.

In this specification, the set of all dependencies inbound to a node of the hierarchy and inbound to any descendent of the node in the hierarchy will be referred to as a set of aggregated inbound dependencies. In other words, the set of aggregated inbound dependencies is a set union of dependencies inbound to the node and dependencies inbound to any descendent of the node in the hierarchy.

Conversely, the set of all dependencies outbound from a node of the hierarchy and dependencies outbound from any descendant of the node in the hierarchy will be referred to as a set of aggregated outbound dependencies. The set of aggregated outbound dependencies is a set union of dependencies outbound from the node and dependencies outbound from any descendant of the node in the hierarchy.

An aggregated dependency thus represents a non-empty intersection between a set of aggregated inbound dependencies and a set of aggregated outbound dependencies.

Typically, dependency relationships represent a single raw dependency graph for the snapshot. Likewise, hierarchical relationships represent a single hierarchy for the snapshot. In contrast, a vast number of aggregated dependency graphs are possible for a snapshot depending on which dependencies are aggregated.

In FIG. 1C, for example, the project node 102*c* and three directory nodes 104*c*, 106*c*, and 108*c* have been chosen for dependency aggregation. In the resulting aggregated dependency graph, the project node 102*c* is illustrated as containing the three directory nodes 104*c*, 106*c*, and 108*c*.

Each aggregated dependency link between the nodes in the graph 100*c* is displayed with a count that represents a number of dependencies that contributed to the aggregated dependency. For example, the "/home/jdoe/src" node 106*c* has one dependency on the "/usr/include" node 104*c* because the file main.c in "home/jdoe/src" called one function defined in the file f.c located in the directory "/usr/include." The "/home/jdoe/src" node 106*c* has two dependencies on "/home/jdoe/test" node 108*c* because main.c and a.c called two functions that were defined by files in that directory. The link from the "/home/jdoe/src" node 106*c* to the "/home/jdoe/test" node 108*c* may be somewhat surprising to a developer or a system architect. This is because it is difficult to see the relationship between those directory from looking at the source code alone or even a raw dependency graph. In addition, it is immediately clear, even at a very high level of inspection, that the project includes a cyclic dependency. In particular, a cyclic dependency exists between the "/home/jdoe/src" node 106*c* and the "/home/jdoe/test" node 108*c*. The reason that this cyclic dependency arises may not be clear from browsing the source code itself or complexity of the raw dependency graph 100*a*. In fact, it arose because functions defined in "home/jdoe/src" call a function defined in "/home/jdoe/test," which itself calls a function defined in "/home/jdoe/src."

The counts associated with the links also provide an intuitive indication of how intertwined the software elements are. For example, it is immediately clear that breaking the cyclic dependency in the graph 100*c* is probably easier, from a source code development perspective, to remove the link with the count of one rather than the link with the count of two.

Thus, computing aggregated dependencies allows a user to explore the structure of the source code in an intuitive way and to intuitively uncover dependencies and potential problems with the design of the code.

Figure 2:
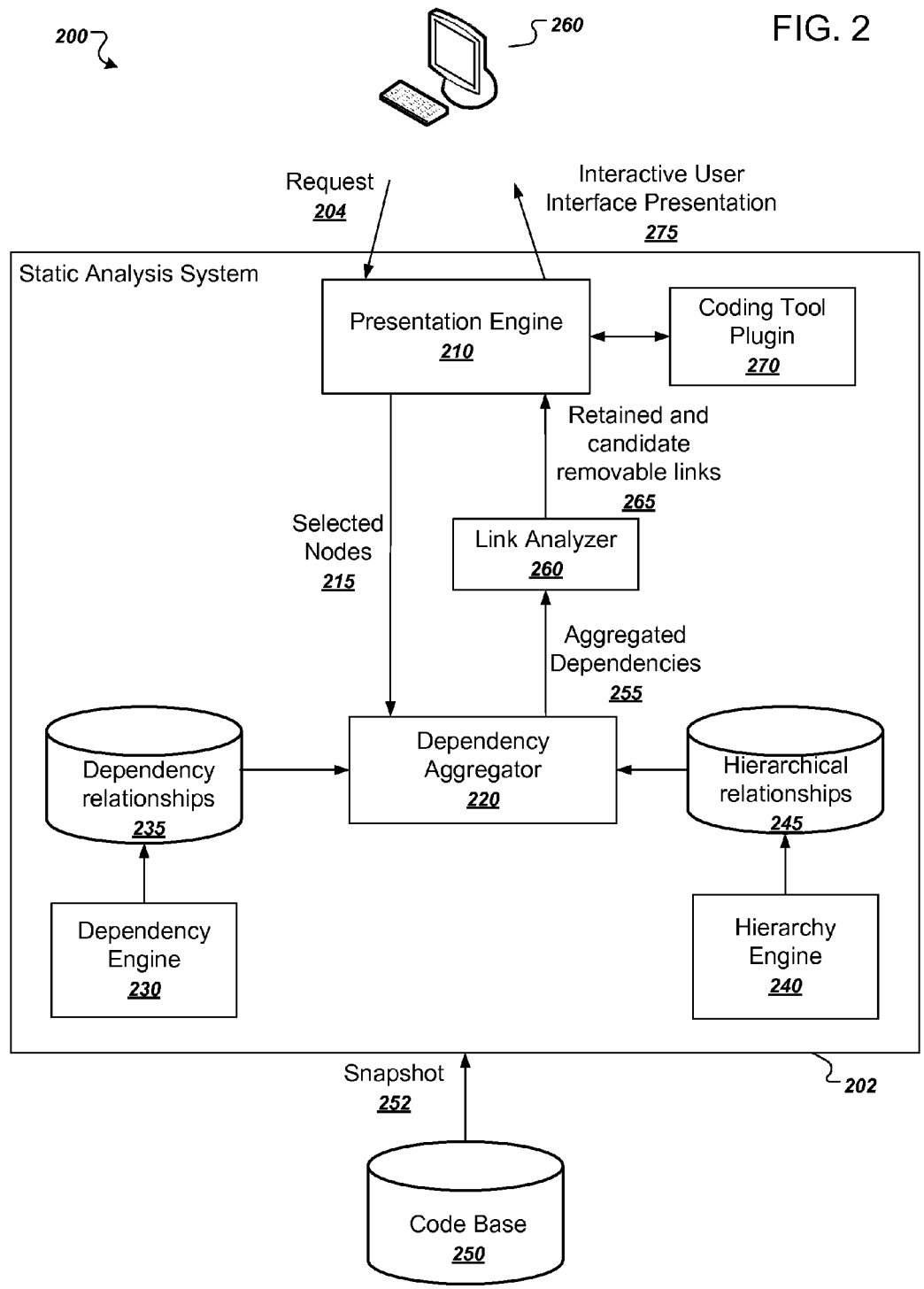
FIG. 2 illustrates an example system.

FIG. 2 illustrates an example system 200. The system 200 includes a user device 260 in communication with a static analysis system 202. The static analysis system 202 includes several functional components, including a presentation engine 210, a dependency aggregator 220, a dependency engine 230, a hierarchy engine 240, a link analyzer 260, and a coding tool plugin 270. Each of these components of the static analysis system 202 can be implemented as computer programs installed on one or more computers in one or more locations that are coupled to each other through a network.

A user of user device 260 can communicate with the static analysis system 202 to browse an interactive user interface presentation of aggregated dependencies between source code elements in the code base 250. Typically only one snapshot 252, or a portion thereof, of the code base 250 is analyzed at a time.

The user device 260 can communicate with the static analysis system 202 over a network, which can be any appropriate communications network, e.g., an intranet or the Internet, or some combination thereof. Alternatively, the static analysis system 202 can be installed in whole or in part on the user device 260.

For example, a user of user device 260 can provide a request 204 that specifies a portion of the snapshot 252 to be analyzed. The request 204 can be generated by an application installed on the user device 260. The application can be a dedicated coding tool or a light-weight client, e.g., a web browser.

Coding tools include any appropriate application that facilitates selection, by a user, of a subset of source code files in the code base 250 that should be analyzed by the system. The static analysis system 202 can use a coding tool plugin 270 to integrate the analysis of source code with a particular coding tool. The coding tool plugin 270 is a software application or module that extends the capabilities of a coding tool by allowing the selection of source code elements and the presentation of analysis results generated by the static analysis system 202 to be integrated into the coding tool. The implementation of the coding tool plugin 270 will depend on the particular coding tool being extended. For simplicity, only one coding tool plugin 270 is shown. However, the system 202 may include multiple coding tool plugins to support a variety of coding tools A presentation engine 210 receives the request 204 and identifies one or more selected nodes 215 that correspond to the request 204. The presentation engine 210 may use the coding tool plugin 270 to identify the selected nodes 215 from a request 204 generated by a coding tool.

For example, the coding tool can be an integrated development environment (IDE). An IDE is an application, or a suite of applications, that facilitates developing source code on a single user device through a graphical user interface. An IDE usually has applications including a source code editor, a compiler, and a debugger. IDEs often also have a file browser as well as object and class browsers. An IDE can use the coding tool plugin 270 to allow the user to select, through the IDE interface, a portion of the code base 250 for analysis. The IDE can then generate the request 204. The coding tool plugin 270 can then automatically identify selected nodes 215 corresponding to software elements for which the aggregated dependencies 255 should be generated. The IDE can also use the coding tool plugin 270 to present the interactive presentation 275 of the aggregated dependencies within the IDE interface.

As another example, the coding tool can be a code review tool. A code review tool is a software application, or suite of software applications, that developers can use to facilitate review of source code files that are the subject of previous or proposed commits or changes to the source code base 250. Thus, a code review tool can use the coding tool plugin 270 to allow a user to select, within an interface of the code review tool, a number of source code files that are part of a proposed commit to the code base 250. The coding tool plugin 270 can then automatically identify selected nodes 215 corresponding to the software elements for which the aggregated dependencies 255 should be generated. The coding tool plugin 270 can then present the interactive presentation 275 of the aggregated dependencies within the code review tool interface.

The dependency aggregator 220 receives the selected nodes 215 and computes aggregated dependencies 255 for the selected nodes 215 using dependency relationships 235 and hierarchical relationships 245.

A dependency engine 230 analyzes code of the snapshot 252 and applies one or more dependency criteria to the code of the snapshot 252 to generate the dependency relationships 235. The dependency engine 230 typically generates the dependency relationships 235 before the request 204 is received.

A hierarchy engine 240 analyzes code of the snapshot 252 as well as the structure of a build system used to build the snapshot to generate the hierarchical relationships 245 using one or more hierarchy criteria. The hierarchy engine 240 also typically generates the hierarchical relationships 245 before the request 204 is received.

Both the dependency criteria used to generate the dependency relationships 235 and the hierarchical criteria used to generate the hierarchical relationships 245 can include language-specific, project-specific, and other user-defined criteria.

Unlike the dependency relationships 235 and the hierarchical relationships 245, the aggregated dependencies 255 are typically computed in real-time. This is due to the vast number of possible software elements and the vast number of possible aggregated dependencies between those software elements making it infeasible in time and storage space to generate every possible aggregated dependency before the request is received. In other words, the dependency aggregator 220 computes the aggregated dependencies 255 after the system 202 receives the request 204 and after receiving the identification of the selected nodes 215.

The dependency aggregator 220 provides the aggregated dependencies 255 to a link analyzer 260. The link analyzer 260 processes the aggregated dependencies 255 to identify candidate removable links. Candidate removable links are suggestions for how the project can be improved. Candidate removable links can be identified due to links violating one or more explicit or implicit rules for how aggregated dependencies among software elements in the project should be arranged. In reality, a candidate removable link cannot simply be removed without incurring consequences to the project. For example, developers will typically need to modify one or more source code files in order to remove a link from the aggregated dependency graph.

One example of an implicit rule that is almost universal in all software development is that cyclic dependencies are undesirable. Thus, the system can identify cycles in the graph and suggest, by providing candidate removable links, ways that the cycles can be removed from the graph with minimal impact to the project. The link analyzer 260 thus classifies links in the aggregated dependencies as retained links or candidate removable links. Classifying links as retained links or candidate removable links is described in more detail below with reference to FIG. 5. The link analyzer then provides the retained and candidate removable links 265 to the presentation engine 210.

The presentation engine 210 generates an interactive user interface presentation 275 having the retained and candidate removable links 265. The interactive user interface presentation 275 displays aggregated dependencies 255 for the portion of the snapshot 252 identified by the request 204. The presentation engine 210 then provides the interactive user interface presentation 275 back to the user device 260 for presentation to the user, possible by using the coding tool plugin 270. Example interactive user interface presentations that make use of retained and candidate removable links are described in more detail below with reference to FIGS. 6A-6F.

Figure 3:
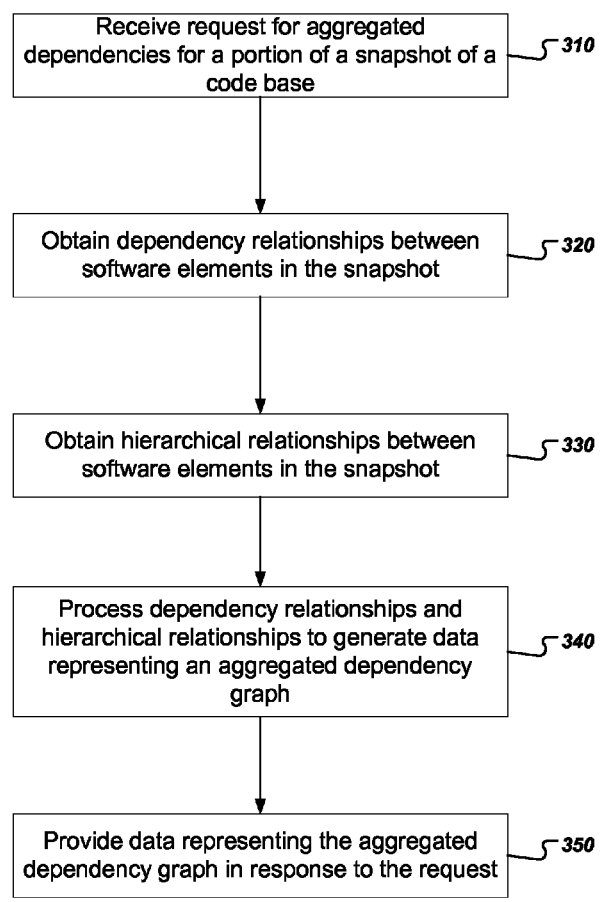
FIG. 3 is a flow chart of an example process for generating aggregated dependencies.

FIG. 3 is a flow chart of an example process for generating aggregated dependencies. A system can use dependency relationships and hierarchical relationships to generate aggregated dependencies for a selected portion of a snapshot. The process will be described as being performed by an appropriately programmed system of one or more computers, e.g., the static analysis system 202 of FIG. 2.

The system receives a request for aggregated dependencies for a portion of a snapshot of a code base (310). The request can for example specify one or more software elements of the snapshot for which aggregated dependencies should be generated.

For example, the user can view an interactive presentation of an aggregated dependency graph. Example interactive presentations of the aggregated dependency graph are described in more detail below with reference to FIGS. 6A-6F.

The system obtains dependency relationships between software elements in the snapshot of the code base (320). The system can represent each distinct software element in the snapshot with a unique ID. The system can also maintain metadata for each distinct software element in a metadata table or other form of data storage. The metadata for a software element can include location information, for example, a location in a file of the software element, a location of the file in a file system, or both.

The system can represent a dependency relationship with a pair of software element IDs. A first software element of the pair, which is referred to as the source element, represents a software element that depends on a second software element of the pair, which is referred to as the target element. Because of the directional nature of the dependency relationships, two software elements can depend on each other, in which case two dependency relationships would exist between the two software elements.

The system can store the dependency relationships as a two-column table. The first column represents the software element ID of the source element, and the second column represents the software element ID of the target element. The system can then use the row number of the table to uniquely identify each dependency relationship.

The system obtains hierarchical relationships between software elements in the snapshot of the code base (330). The system can represent a hierarchical relationship with a pair of software element IDs. A first software element of the pair, which can be referred to as the parent element, represents a software element that is a parent in a hierarchy of a second software element of the pair, which can be referred to as the child element.

The system can likewise store the hierarchical relationships in a two-column table. The first column represents the software element ID of the parent element, and the second column represents the software element ID of the child element. The system can then use the row number of table to uniquely identify each hierarchical relationship.

The system can define a number of different hierarchical relationships in order to generate the hierarchy graph. For example, instead of using files and directories as the nodes of the hierarchy, the system could use namespaces to define the hierarchy. Then, if different classes were defined in different files but were in the same namespace, nodes representing the classes would share a parent in the hierarchy.

The system processes the dependency relationships and the hierarchical relationships to generate data representing an aggregated dependency graph (340). For each pair of selected nodes representing software elements, the system can determine whether a first software element of the pair or any of its descendants depends on a second software element of the pair or any of its descendants. If so, the system generates a link representing the aggregated dependency between the nodes representing the first and second software elements.

Computing the aggregated dependencies from the dependency relationships and the hierarchical relationships will be described in more detail below with reference to FIG. 4.

The system provides the data representing the aggregated dependency graph in response to the request (350). For example, the system can generate a presentation that illustrates the aggregated dependency graph. The system can also generate any appropriate representation of the graph for consumption by another software tool.

Figure 4:
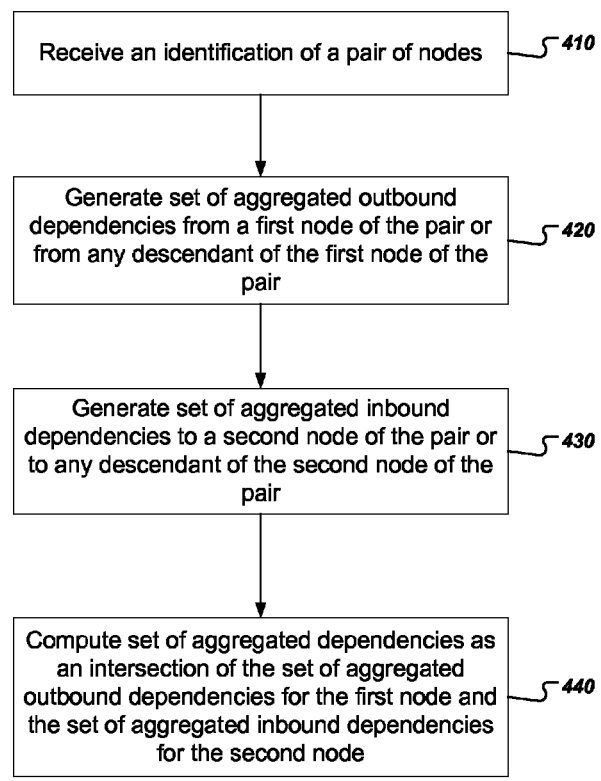
FIG. 4 is a flow chart of an example process for computing aggregated dependencies between a pair of nodes.

FIG. 4 is a flow chart of an example process for computing aggregated dependencies between a pair of nodes in the hierarchy. The process will be described as being performed by an appropriately programmed system of one or more computers, e.g., the dependency aggregator 220 of FIG. 1.

The system receives an identification of a pair of nodes (410). Each node represents a software element in the hierarchy. For example, a user can provide a selection of one or more nodes of a portion of an aggregated dependency graph.

The system generates a set of aggregated outbound dependencies, which is a set union of dependencies outbound from a first node of the pair and dependencies outbound from any descendants of the first node in the hierarchy (420). As described above, each dependency relationship in the snapshot has a unique ID. Thus, the system can generate a set of aggregated outbound dependencies as a set of all dependency IDs in which the first node or any descendant of the first node in the hierarchy occurs as a source element.

The system generates a set of aggregated inbound dependencies, which is a set union of dependencies inbound to a second node of the pair and dependencies inbound to any descendants of the second node in the hierarchy (430). Similarly, the system the system can generate a set of aggregated inbound dependencies as a set of dependency IDs in which the second node or any descendant of the second node in the hierarchy occurs as a target element.

The system computes a set of aggregated dependencies as an intersection of the aggregated outbound dependencies for the first node and the aggregated inbound dependencies for the second node (440). If the intersection is not empty, the system generates an aggregated dependency link from the first node to the second node. The system can repeat the process in reverse for determining whether an aggregated dependency link exists from the second node to the first node.

Techniques for representing the sets of aggregated inbound dependencies and aggregated outbound dependencies and for quickly computing the intersection of the sets using these representations are described in more detail below.

Figure 5:
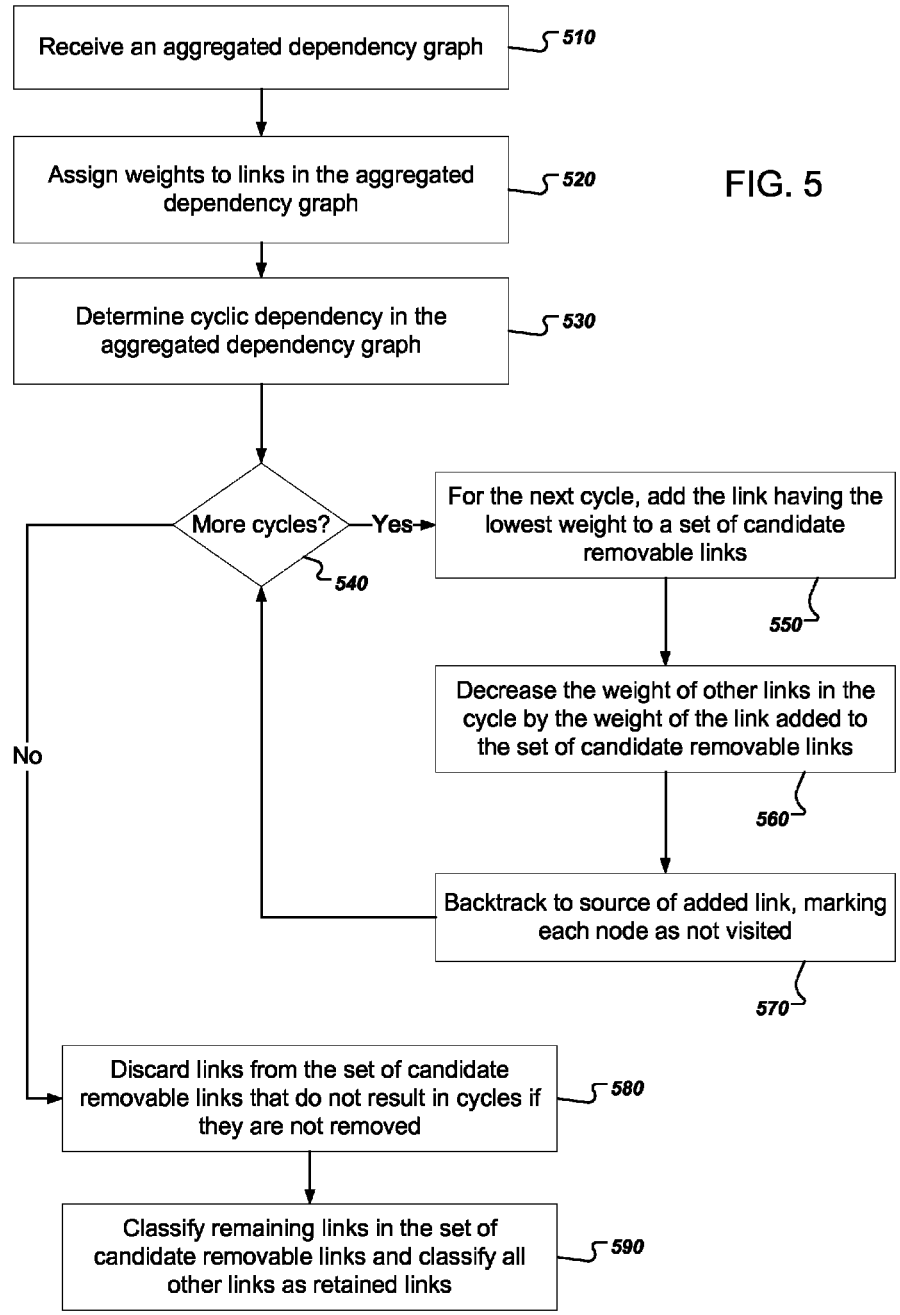
FIG. 5 is a flow chart of an example process for identifying candidate removable links.

FIG. 5 is a flow chart of an example process for identifying candidate removable links due to cycles. The system can analyze links in an aggregated dependency graph to identify cyclic dependencies. Cyclic dependencies are usually a problem for software projects because they represent a breakdown in modularity and thus introduce problems in maintainability. For example, if a file A depends on a file B, and the file B depends on a file C, and the file C depends on the file A, a cyclic dependency exists. Therefore, any changes made to file A may also require changes to file B and also file C to avoid breaking the build. The example process can automatically suggest, e.g., to a software architect, how to address such cyclic dependencies in a code base. The process will be described as being performed by an appropriately programmed system of one or more computers, e.g., the link analyzer 120 of FIG. 1.

The system receives an aggregated dependency graph (510). As described above, the system can compute the aggregated dependency graph from dependency relationships and hierarchical relationships. The system can compute the aggregated dependency graph in response to a user selection of one or more nodes representing software elements of a code base.

The system assigns weights to links in the aggregated dependency graph (520). Between a first software element and a second software element, the weight of a link represents how significantly the first software element depends on the second software element. The significance of the dependency increases as the number of descendants of the first software element that depend on the second software element or any descendants of the second software element increases.

In some implementations, the system computes a count of dependencies from the first software element and any descendants of the first software element to the second software element or any descendants of the second software element. The system then uses the count to compute the weight for the link between the first software element and the second software element. In some cases, the weight is the count itself.

The system can also use a variety of other factors when computing the weight. For example, the system can consider the type of dependency, as some types of dependencies are easier to remove than others. The system can also consider a measure of how tangled a target of the dependency is with siblings of the target. For example, if A depends on a constant defined in B, and the constant in B is not used at all, then the constant can be moved to A with little difficulty. On the other hand, if the constant is used throughout B, removing the dependency is harder and the system can adjust the weight accordingly. The system can also consider other factors, e.g., cyclomatic complexity of a target of the dependency.

One benefit of using the count of dependencies as the weight is that it provides a user with a very useful and intuitive sense for how hard the link would be to remove. When the weight represents a count of dependencies, the weight intuitively indicates how many software elements need to be changed in order to remove the link.

The system can also compute the weight based on a distance between the first software element and the second software element. The distance can represent how intertwined the two software elements are in terms of their occurrences in the code base. For example, if the first software element and the second software element co-occur infrequently, the distance is likely to be large. But if the first software element and the second software element co-occur frequently, the distance is likely to be small. In this context, distance is inversely proportional to weight because a large distance represents a smaller significance of the dependency between the software elements. Thus, a larger distance will result in a smaller weight.

The system need not compute weights of the links as a separate and subsequent process to that of generating the aggregated dependency graph. Rather, the system can compute the weights of the links as the aggregated dependency graph is being constructed.

In some implementations, the system provides a user interface that allows a user to mark some links as non-candidates for removal. This can be useful, for example, when a portion of the code base is not controlled by the user. Thus, in response to the user designation of links as non-candidates for removal, the system can assign a very high weight or a special value that indicates that the link is not to be classified as removable under any circumstances.

The system determines cyclic dependencies in the aggregated dependency graph (530). A software element A depends transitively on a software element B if a path in the aggregated dependency graph exists from a node representing software element A to a node representing the software element B. A cyclic dependency occurs whenever a particular node transitively depends on itself.

The system can determine cyclic dependencies using any appropriate search procedure. For example, the system can perform a recursive depth-first search, marking nodes as "visited" as they are processed. When the system processes a node that has already been marked as visited, the system can determine that a cyclic dependency exists. When the system determines that a cyclic dependency exists, the system processes links along the cycle to identify a candidate link for removal.

Thus, if there are more cycles to be processed (540), the system processes the next cycle by adding the link along the cycle having the lowest weight to a set of candidate removable links (branch to 550). The set of candidate removable links identifies candidate links that the system can suggest to a user as ways to get rid of cyclic dependencies in the code base.

The system decreases the weight of other links in the cycle by the weight of the link that was added to the set of candidate removable links (560). Decreasing the weight of other links in the cycle can reveal when a heavy link that is part of multiple cycles is more preferable to remove than multiple light links on single cycles. In other words, as each cycle of the heavy link is processed, the heavy link becomes effectively cheaper and cheaper to remove.

The system backtracks to the source of the added link, marking each node as not visited (570). The system has already determined a candidate link for removing the currently detected cycle. However, the system can mark nodes on the cycle as "not visited" so that they will be considered appropriately if they are part of other cycles in the graph.

The system can then continue searching the graph for additional cycles, processing each newly found cycle.

If there are no more cycles to be processed (540), the system discards links from the set of candidate removable links that do not result in cycles if they remain in the graph (branch to 580). Because each cycle is processed separately, it is possible that the set of candidate removable links includes more links than must be removed to remove all cycles in the aggregated dependency graph. For example, after adding a first link to the set of candidate removable links that would break cycle C1, the system may then add a second link to the set of candidate removable links that would break cycle C2 and which would also happen to break cycle C1 as well. Thus, the first link and the second link need not both be in the set of removable links. Rather, the first link can be discarded from the set of removable links so that it will be reclassified as a retained link.

Because the weight of the links approximates the amount of work that would be required to remove the link, the system can discard links in the set of candidate removable links in order of decreasing weight. In other words, the system can iterate over links in the set of candidate removable links from heaviest to lightest, discarding each link from the set that would not reintroduce a cycle, assuming that all other links in the set of candidate removable links were indeed removed.

In some implementations, the system provides a user interface that allows the user to specify an order in which the candidate removable links should be discarded from the set. This can be useful, for example, when parts of the code base represent well-tested or legacy software that the user would rather not modify significantly. Thus, the user can move links from parts of the code base that the user does not want to modify to the top of the list, and the system will first attempt to remove those links from the set of candidate removable links.

The system classifies remaining links in the set of candidate removable links and classifies all other links as retained links (590). In other words, the system classifies links that are not candidates for removal as retained links. The system can then suggest links that are classified as candidate removable links to the user.

To do so, the system can then generate various user-interface presentations that illustrate the aggregated dependency graph arranged according to retained and candidate removable links.

FIGS. 6A-6L illustrate example user interface presentations of aggregated dependency graphs. Each example presentation illustrates a different layout for presenting an aggregated dependency graph according to links classified as candidate removable links and links classified as retained links.

The examples illustrate the structure of a simple example software project "even-or-odd" written in C and which has the following source code files.

First, the project includes a main file, main.c, which has the following source code:

```
#include <stdio.h>
#include "even.h"
int main( ) {
int val;
printf("Enter a number:");
scanf("% d", &val);
if (even(val))
    printf("% d is even\n", val);
else
    printf("% d is odd\n", val);
return 0;
}
```

The "even" function is declared in even.h, which has the following source code:
int even(int);

The "even" function is defined in even.c, which has the following source code:

```
#include <stdio.h>
#include "odd.h"
int even(int x) {
if (x==0)
  return 1;
if (x>0)
  return odd(x−1);
else
  return odd(x+1);
}
```

The function "even" depends on an "odd" function declared in odd.h, which has the following source code:
int odd(int);

The function "odd" is defined in odd.c, which has the following source code:

```
#include <stdio.h>
#include "even.h"
int odd(int x) {
if (x==0)
  return 0;
return even(x>0 ? x−1: x+1);
}
```

As shown in the example source code, the function "odd" has one dependency on the function "even" due to calling the function "even" one time, while the function "even" has two dependencies on the function "odd" due to calling the function "odd" twice. Also, because the two functions depend on each other, the aggregated dependency graph will include a cycle. After processing the source code of this project and generating aggregated dependencies, the system can generate a variety of layouts to present this information.

Figure 6A:
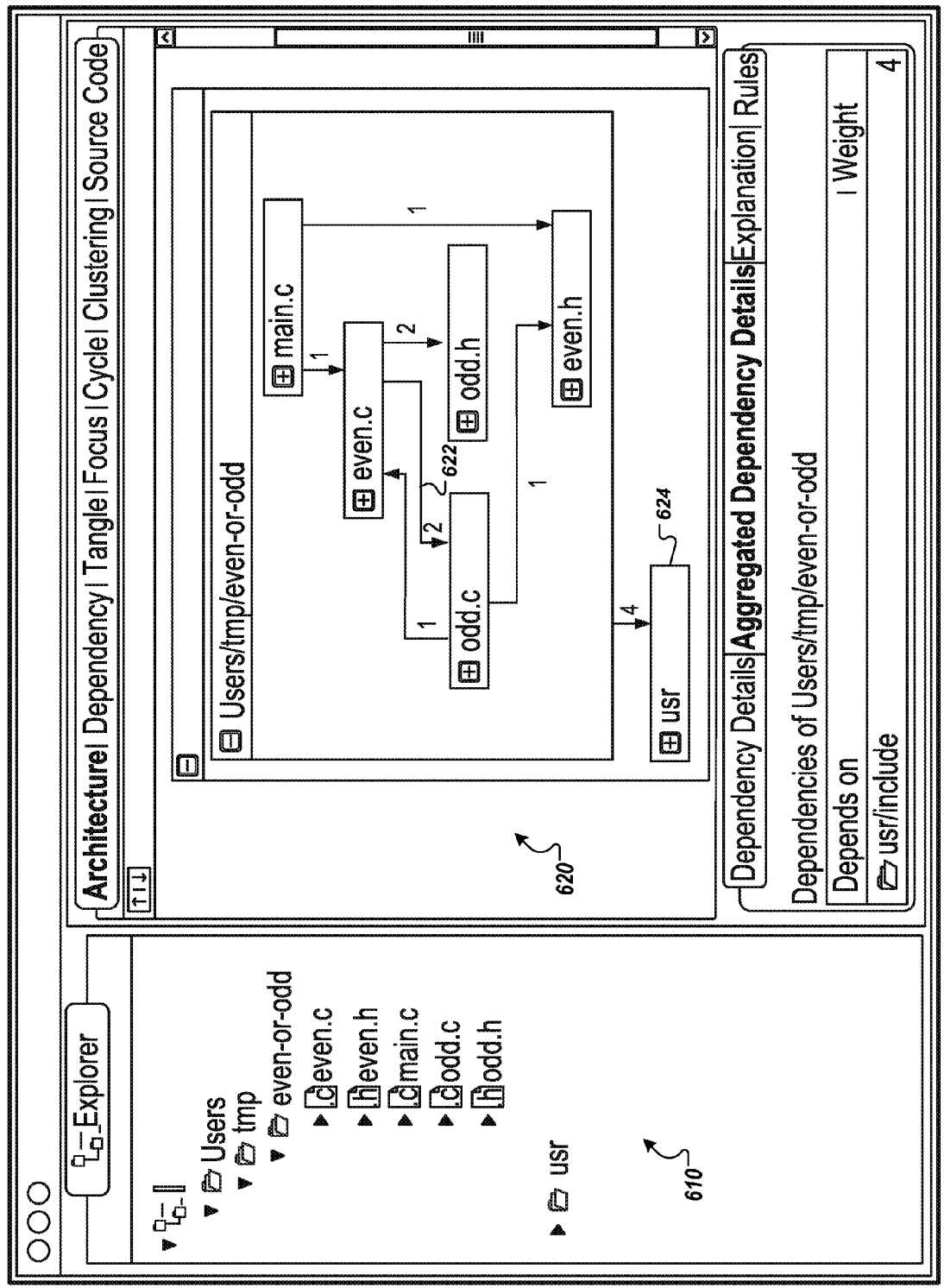

FIG. 6A illustrates a default layout. The default layout illustrates nodes that represent software elements and links that represent aggregated dependencies between the software elements. Each node may have multiple descendant nodes according to the hierarchy graph.

The example presentation includes a hierarchy explorer 610 that allows a user to interactively browse the hierarchy graph. The example presentation also includes an aggregated dependency graph pane 620 that shows nodes from the hierarchy and links representing the aggregated dependencies between them.

Each of the links is presented with an associated count representing the number of dependencies between the corresponding software elements. The link 622, for example, represents that the file even.c has two dependencies on the file odd.c.

In the default layout, all nodes of the hierarchy are selected for presentation. However, the system may cut off some nodes at a particular level of detail in order to comply with space limitations of the aggregated dependency graph pane 620. For example, the illustrated aggregated dependency graph also includes a "usr" node 624 that contains only system software code, as opposed to user code.

A user can also select or filter dependencies by type. In other words, the user can choose different types of dependencies to be shown or hidden from the graph.

Figure 6B:
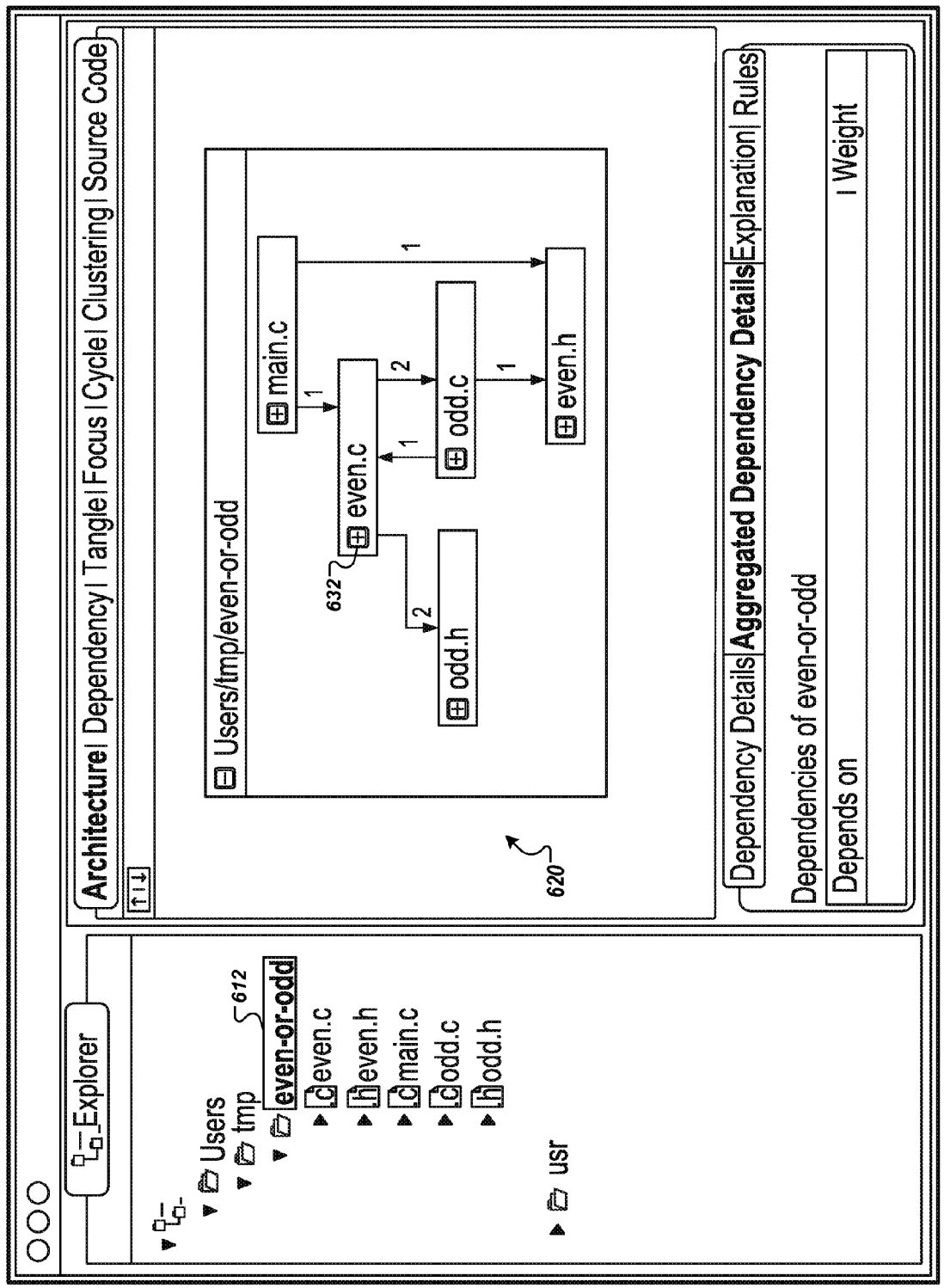

FIG. 6B illustrates selection of a directory node of the hierarchy. A user can select or filter one or more nodes in the presentation to view additional nodes and their aggregated dependencies. For example, in FIG. 6B a user has selected the directory node 612 of the hierarchy corresponding to the "even-or-odd" directory. In this view, if both a child and a parent node are selected, the parent node will be displayed, with the children nested inside it.

In response to the selection, the system updates the presentation of the aggregated dependency graph to show only a graph having the selected nodes of the hierarchy. In this example, the aggregated dependency graph pane 620 no longer shows a node representing the "usr" system software node.

A user can drill down further into the presented nodes by using an expansion icon presented with each node in the aggregated dependency graph pane 620, e.g., expansion icon 632 of the even.c node.

Figure 6C:
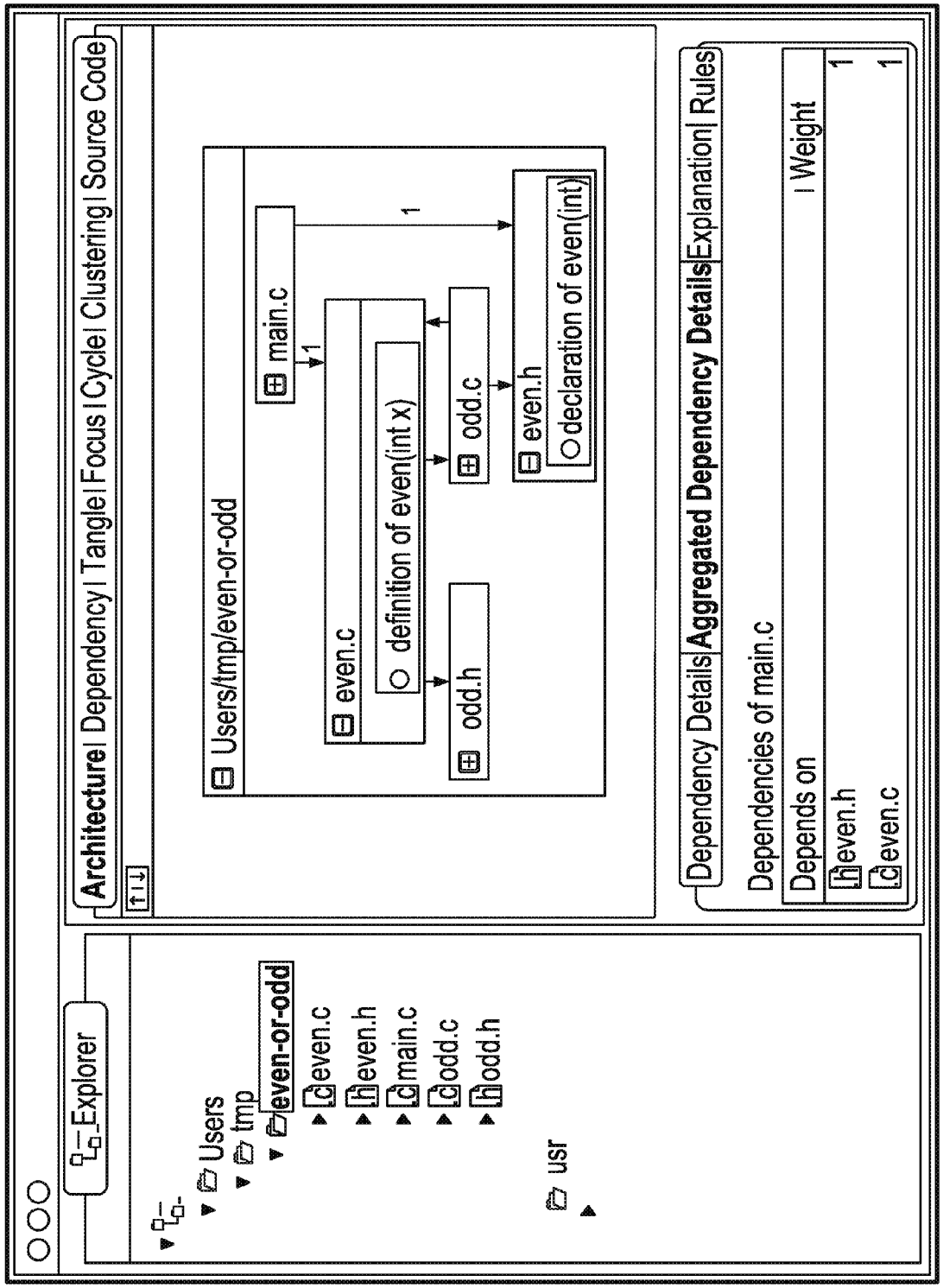

FIG. 6C illustrates expanding a file node of the hierarchy. In FIG. 6C, a user has selected the expansion icons for even.c and even.h. In response, the system displays software elements within the expanded files. For example, a user can choose to expand a node representing a particular software element, which can cause the system to display the immediate children nodes of the selected node according to the hierarchy graph. Or the user can choose to collapse a node to hide its immediate children. Either of these user actions triggers the system to recompute the aggregated dependencies for the nodes to be displayed.

Figure 6D:
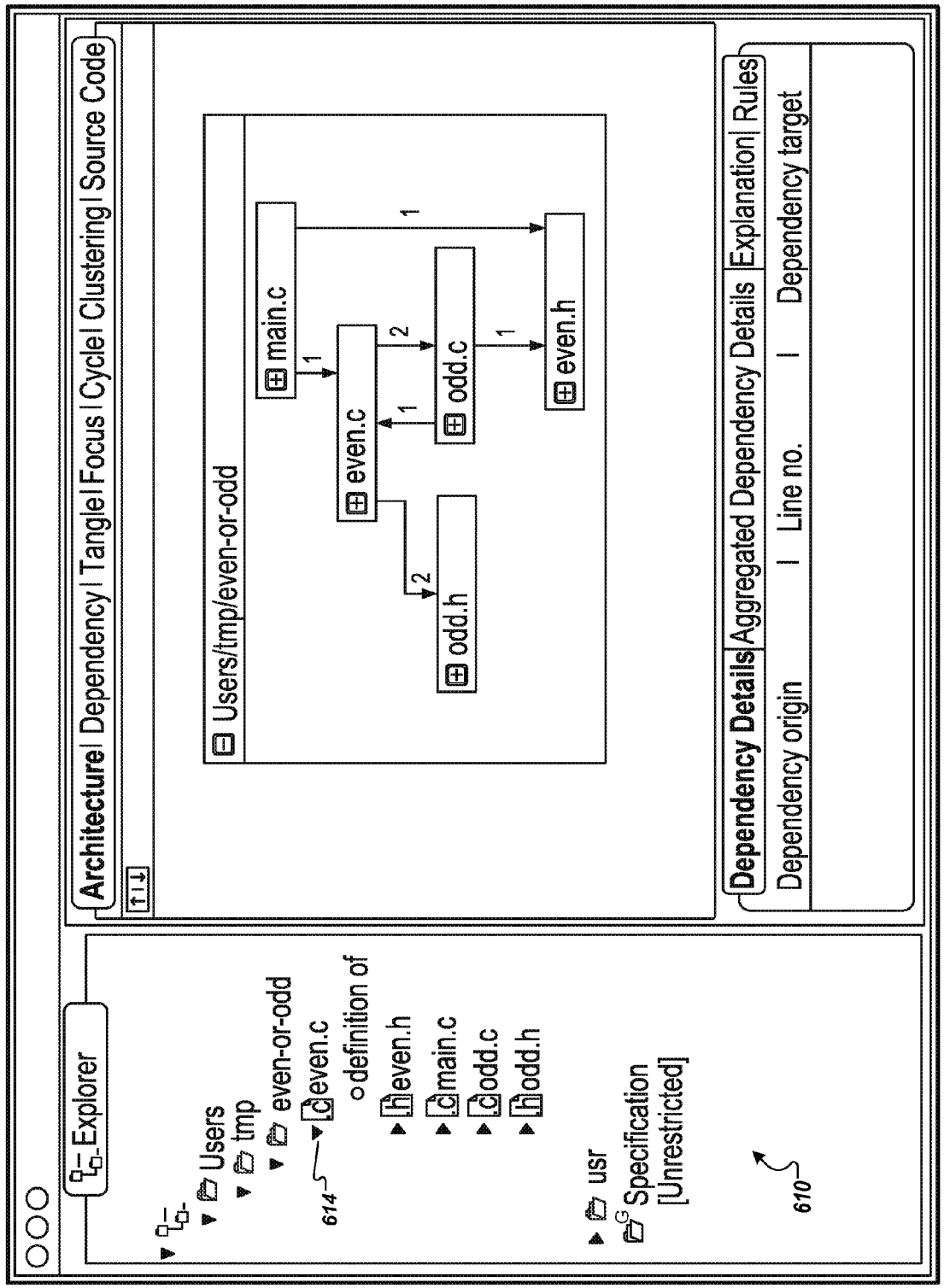

FIG. 6D illustrates expanding a file node in the hierarchy explorer 610. In FIG. 6D, a user has selected an expansion icon 614 presented within the hierarchy explorer 610. In response, the system displays software elements contained within the corresponding file as subnodes in the hierarchy explorer 610.

Figure 6E:
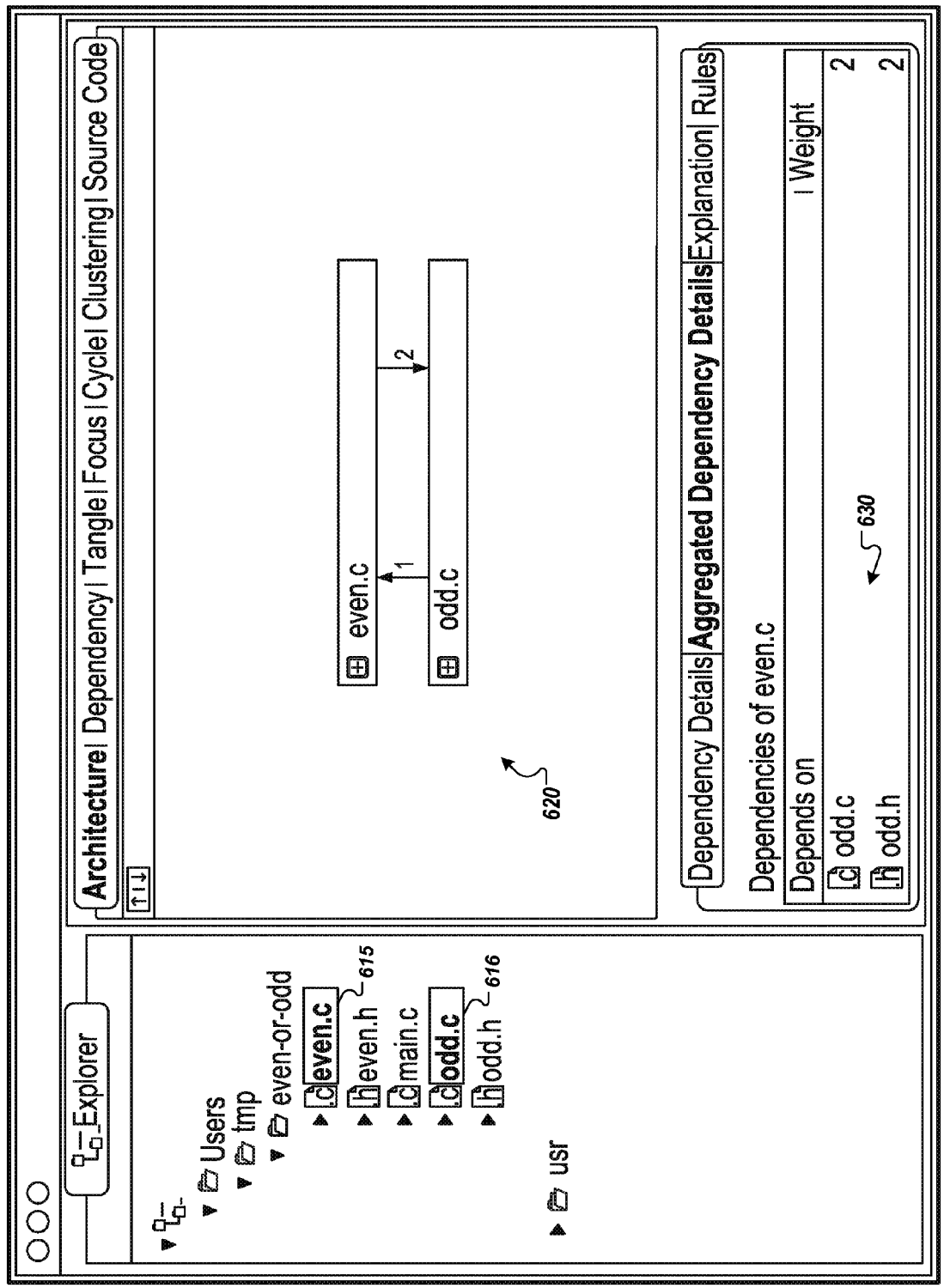

FIG. 6E illustrates selection of multiple file nodes of the hierarchy. In FIG. 6E, a user has selected only a subset of nodes of the project, the even.c node 615 and the odd.c node 616. In response, the system updates the aggregated dependency graph pane 620 to show an aggregated dependency graph with dependencies only between the selected nodes. In this example, the system shows the one dependency of odd.c on even.c and the two dependencies of even.c on odd.c.

Figure 6F:
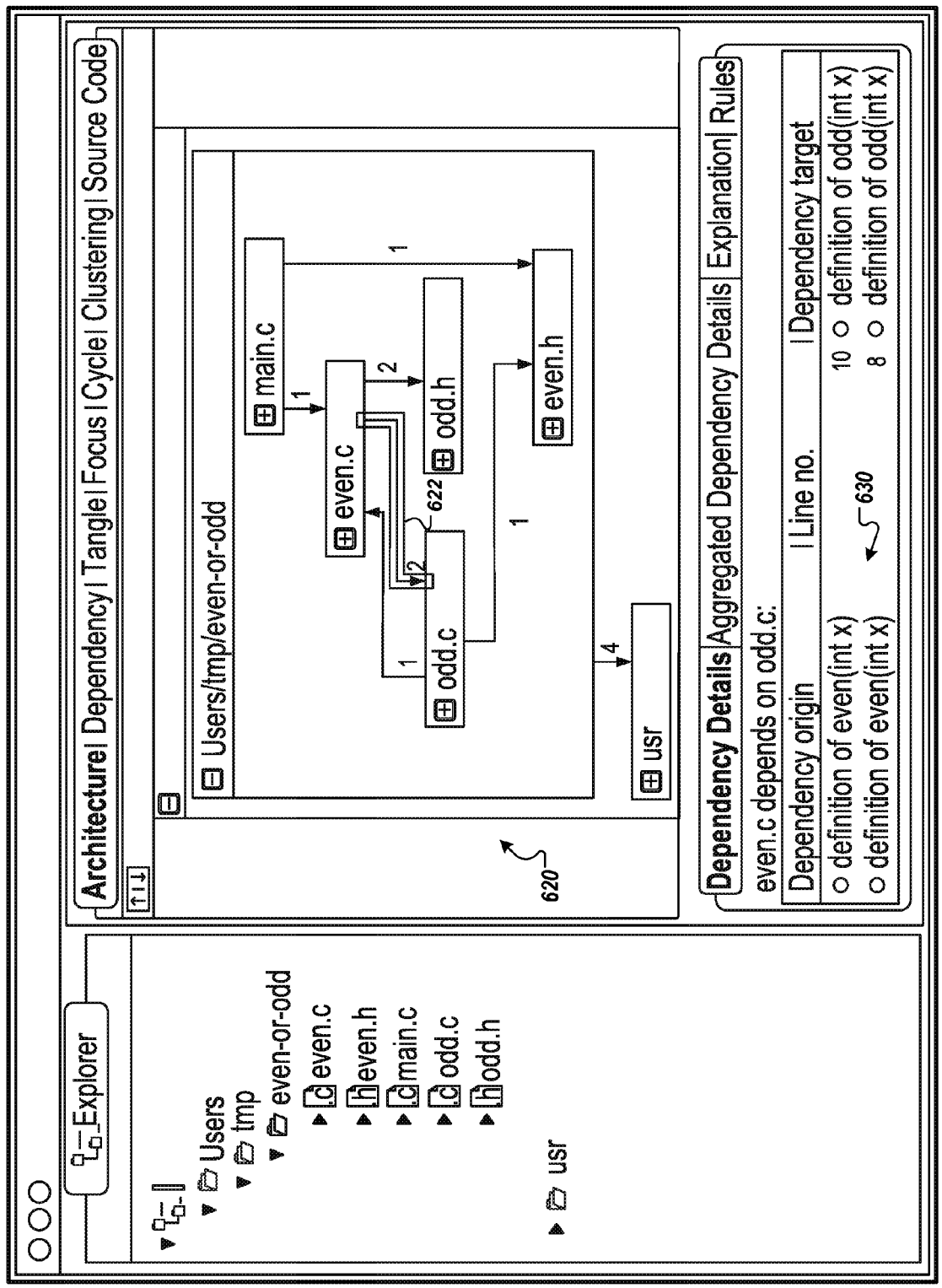

FIG. 6F illustrates selection of a particular dependency. In FIG. 6F, a user has selected a particular dependency 622 in the aggregated dependency graph pane 620. In response, the system displays more details about the corresponding dependencies in a dependency pane 630.

FIG. 6G illustrates a source code file view in response to a dependency selection. In FIG. 6G, a user has selected a particular dependency in the dependency pane 630. In response, the system displays the source code in a source code pane 640 that replaces the aggregated dependency graph pane 620.

The system can highlight the exact source code causing the dependency selected by the user. For example, the source code pane highlights the call to the function "odd" 642, which is the code that causes the dependency selected by the user.

Figure 6H:
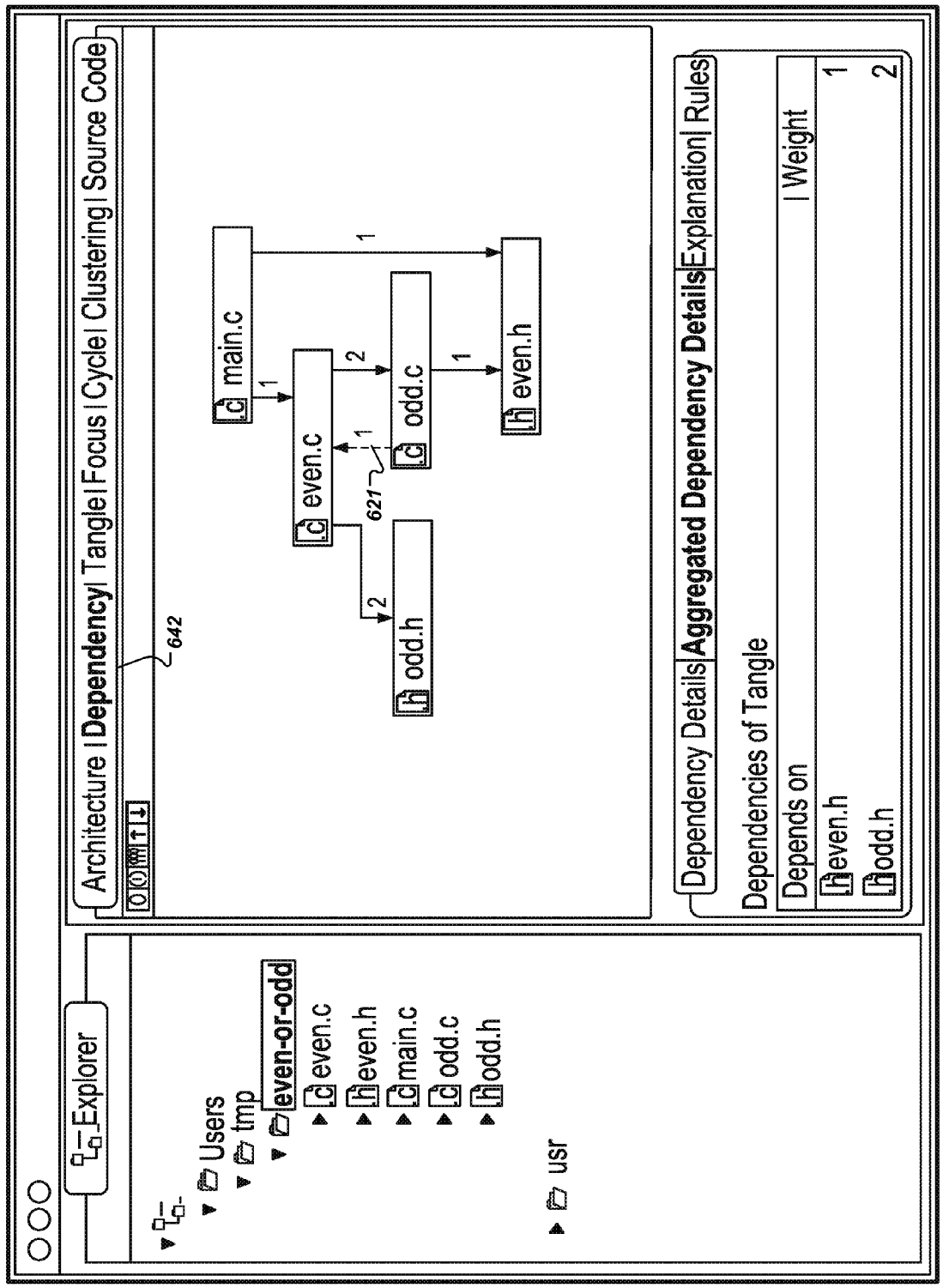

FIG. 6H illustrates candidate removable links. In FIG. 6H, a user has selected a new view for the aggregated dependency graph by selecting the user interface element 642 for the "Dependency" view. In this view, if both a child and a parent are selected, only the children are displayed.

The system then determines one or more candidate removable links for the selected nodes of the hierarchy. For example, the link 621 is a candidate removable link, which the system visually distinguishes from other links by presenting the candidate removable link as a dashed line.

The system can visually distinguish the removable links from the retained links in any appropriate way. For example, the system can present the removable links in a different color, a different style, or a different line thickness, to name just a few examples.

A user can also select or filter the cyclic dependencies by type. Cyclic dependencies in the code base may be problematic for some types of dependencies but not others. For example, include-type dependencies are an example dependency type for which cycles may not be a problem. Thus, the user can select a particular type of dependency to show or filter another particular type of dependency for which cycles are not a problem.

The system can also present the weight of each link near the link itself. The presentation of the weight provides users with an intuitive indication of how much work on the code base would be required to remove each link. For example, the link 621 has a weight of 1, whereas the other link in the cycle has a weight of 2. Thus, removing link 621 will probably require less effort than removing the other link in the cycle.

Figure 6I:
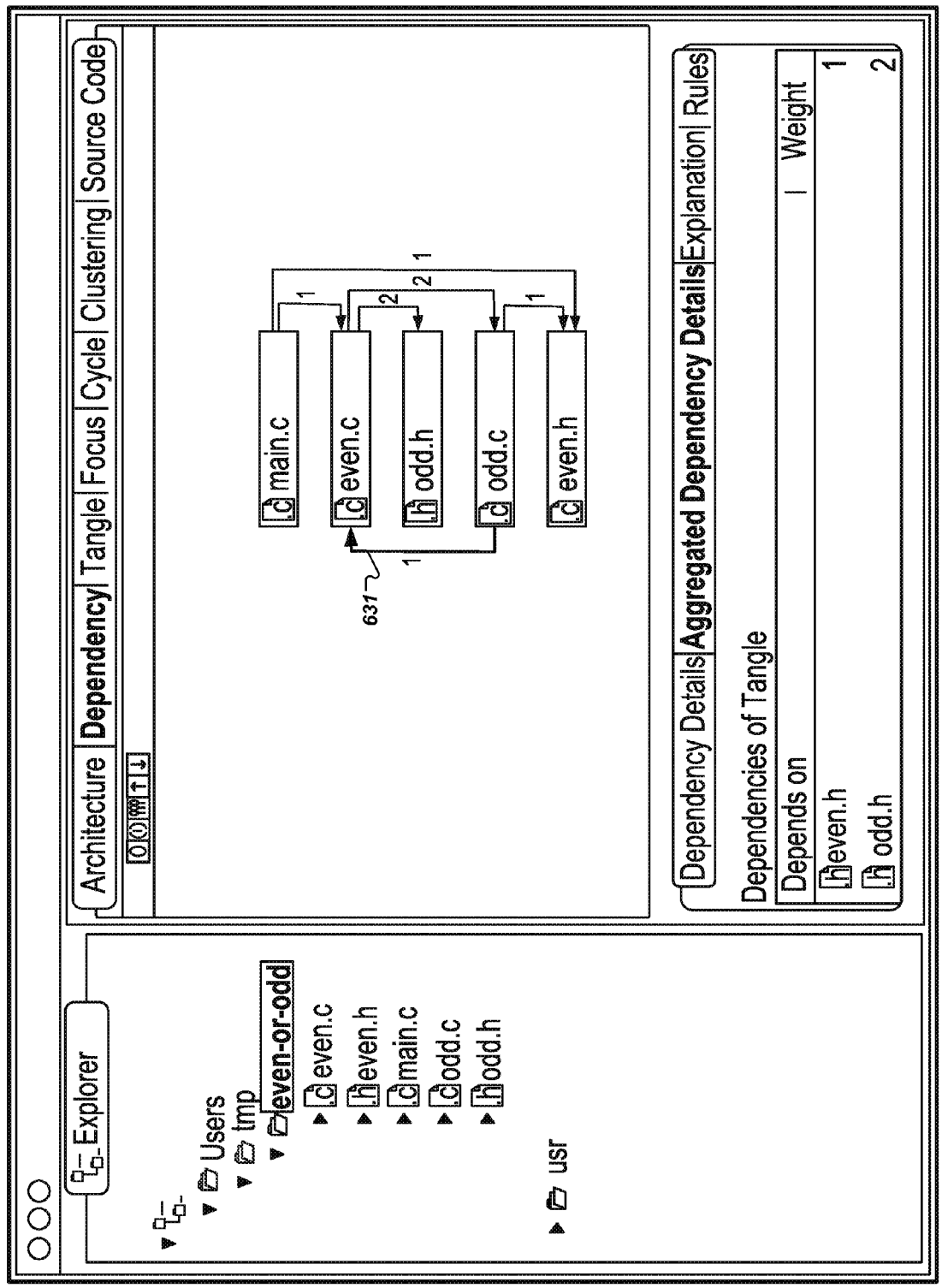

FIG. 6I illustrates a serial layout. In the serial layout, all software element nodes of the aggregated dependency graph are arranged in a column such that all retained links point downwards and all candidate removable links point upwards. In this example, the link 631 is the only candidate removable link, and thus it points upwards while all other links point downwards. This layout reveals an ordered structure of the software elements and highlights the cyclic and acyclic aspects of the code base.

Figure 6J:
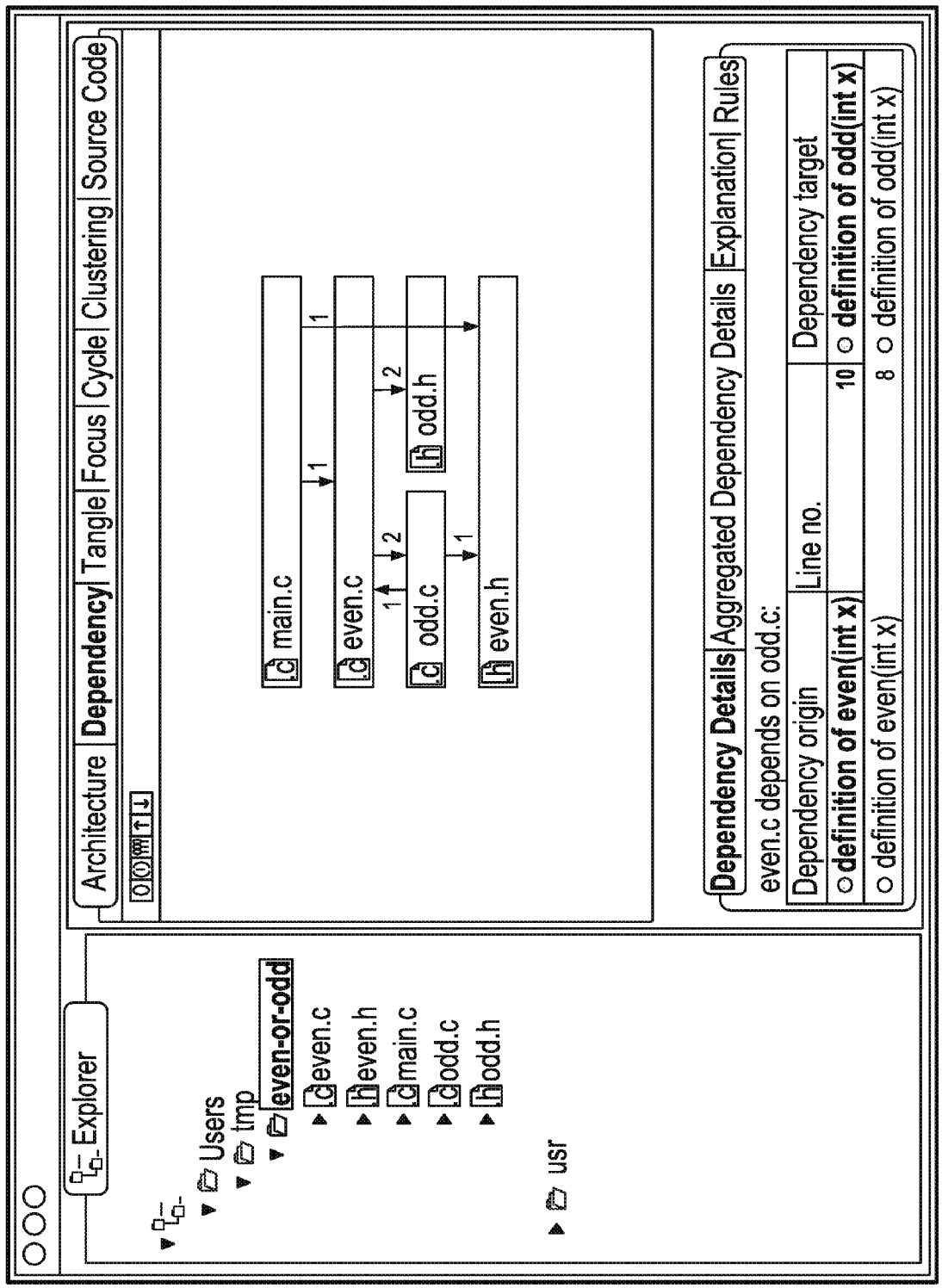

FIG. 6J illustrates a layered layout. In this layout, the system displays all software elements in horizontal layers such that (1) there are no dependencies between software elements in a layer, and (2) all retained links point downwards to other layers, and (3) all candidate removable links point upwards to other layers. This layout reveals a layering and an ordering structure among the software elements. This layout is also generally intuitively understandable for a higher number of software elements and links than the serial layout.

The system can also present a clustered layout that is based on the layered layout. In the clustered layout, the system presents each layer as a proposed cluster and presents links representing aggregated dependencies between the proposed clusters instead of between the individual software elements. The system can generate the clusters as a suggestion to a user for how the software elements should be packaged according to the aggregated dependencies.

Figure 6K:
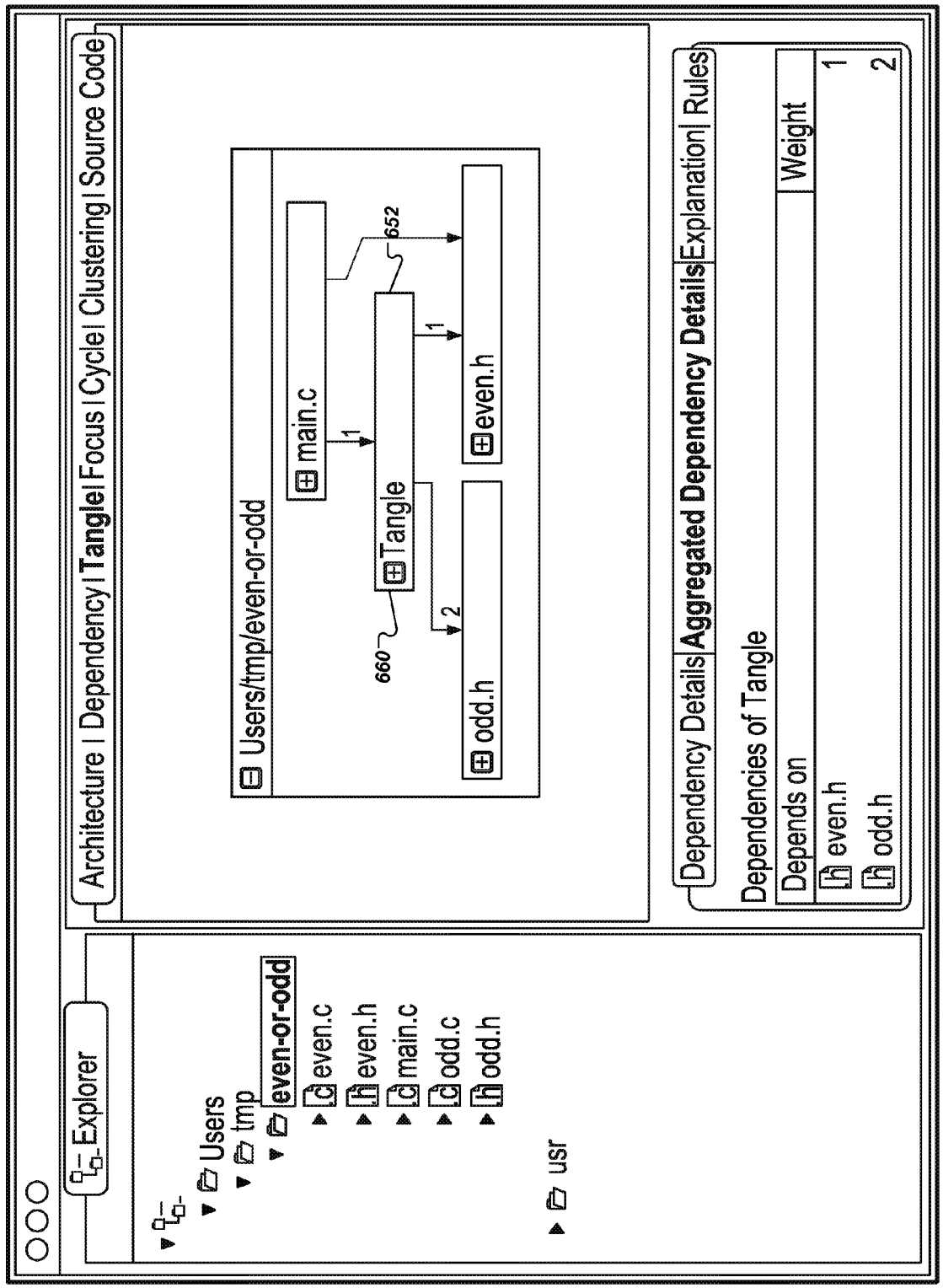

FIG. 6K illustrates a collapsed tangle layout. A tangle is a group of software element nodes that are cyclically connected. A single tangle can include multiple cycles when a particular software element is cyclically connected to multiple cycles.

The system can collapse the nodes in the tangle to represent the tangle as a single tangle node in the aggregated dependency graph. The system can then update the aggregated dependencies to illustrate links between the tangle node and other software elements instead of links between individual software elements of the tangle.

When the system has already classified links in the graph as retained links and candidate removable links, the system can add each node connected to an inbound or outbound removable link to a tangle node. The system can also add nodes that are only connected to other nodes in the tangle to the tangle as well.

FIG. 6K illustrates the same software elements as in FIG. 6A, except with cyclically connected nodes collapsed into a tangle node 652. For example, the tangle node 652 represents multiple nodes that were cyclically connected in FIG. 6A.

When the system collapses all cyclically connected nodes into tangle nodes, the resulting graph is acyclic. For example, the aggregated dependency graph in FIG. 6E is an acyclic graph.

The tangle node 652 in the presentation has a user interface element 660 that allows the user to explore software element nodes in the tangle. In this example, the user interface element 660 is a plus icon, which indicates that the user can select the plus icon to see further software element nodes that are in the tangle.

Figure 6L:
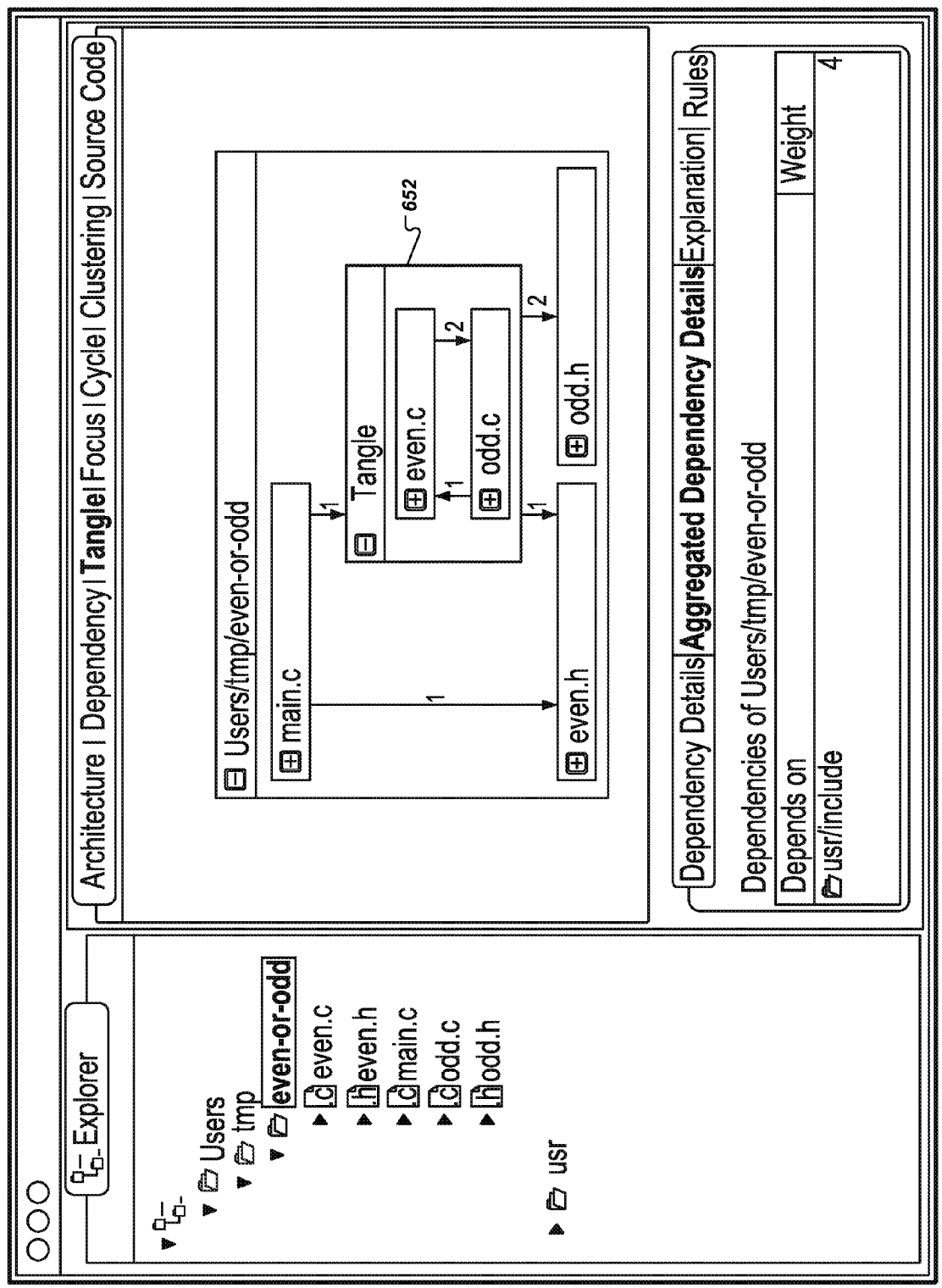

FIG. 6L illustrates an expanded tangle layout. FIG. 6L illustrates the same tangle node 652 that was represented in FIG. 6K. But in FIG. 6L, the tangle node 652 is presented in an expanded view that illustrates all individual software element nodes in the tangle.

The expanded tangle layout shows both (1) aggregated dependencies between the tangle node 650 and other software elements outside the tangle, and (2) aggregated dependencies of the individual software elements inside the tangle.

The expanded tangle layout essentially isolates each tangle as a separate cyclical graph, with each separate cyclical graph represented as an individual tangle node in an acyclic graph. Within the individual tangle nodes, the system can suggest candidate removable links for removal.

The dependency graphs described above may represent each dependency as a link between the location within the software project at which a given software element is used and the location within the software project at which the given software element is defined. As such, the dependency graphing techniques described above are quite useful for representing software elements, such as variables, that are directly referenced and defined at particular locations within the code base of the software project. These dependency graphing techniques can, however, become complicated when representing software projects that include one or more templates, which have compile-time instantiations that do not correspond to any particular location within software project code bases.

A template is a programming language construct that allows another programming language construct, e.g., functions and classes, to be defined to operate on one or more generic types. A programmer can use generic types instead of explicitly defined types, e.g., float or int for C++. This allows the programmer to avoid writing multiple versions of the same source code that differ only by the type involved.

A language construct defined with a template can be invoked with a type parameter that identifies the desired type. At compile time, a compiler uses the type parameter to generate a separate definition of the template-defined language construct. The compiler uses the original definition, but in the compiler-generated definition, the compiler replaces all instances of the generic type with the type specified by the type parameter. Thus, when the compiler-generated version of the source code is instantiated, an instance of the language construct is instantiated with the type specified in the invocation.

This kind of compiler-generated source code poses a problem for dependency graphs. In particular, the compiler-generated source code does not exist anywhere in the code base. Secondly, if the same location as the generic template is assumed for the compiler-generated source code, this can result in counter-intuitive and unhelpful dependencies that purport to show standard template library code depending on user-generated code.

Although techniques for handling template definitions described herein may reference templates written in the C++ programming language, it is to be understood that the techniques can also be applied to any software element having compile-time generated code.

Figure 7:
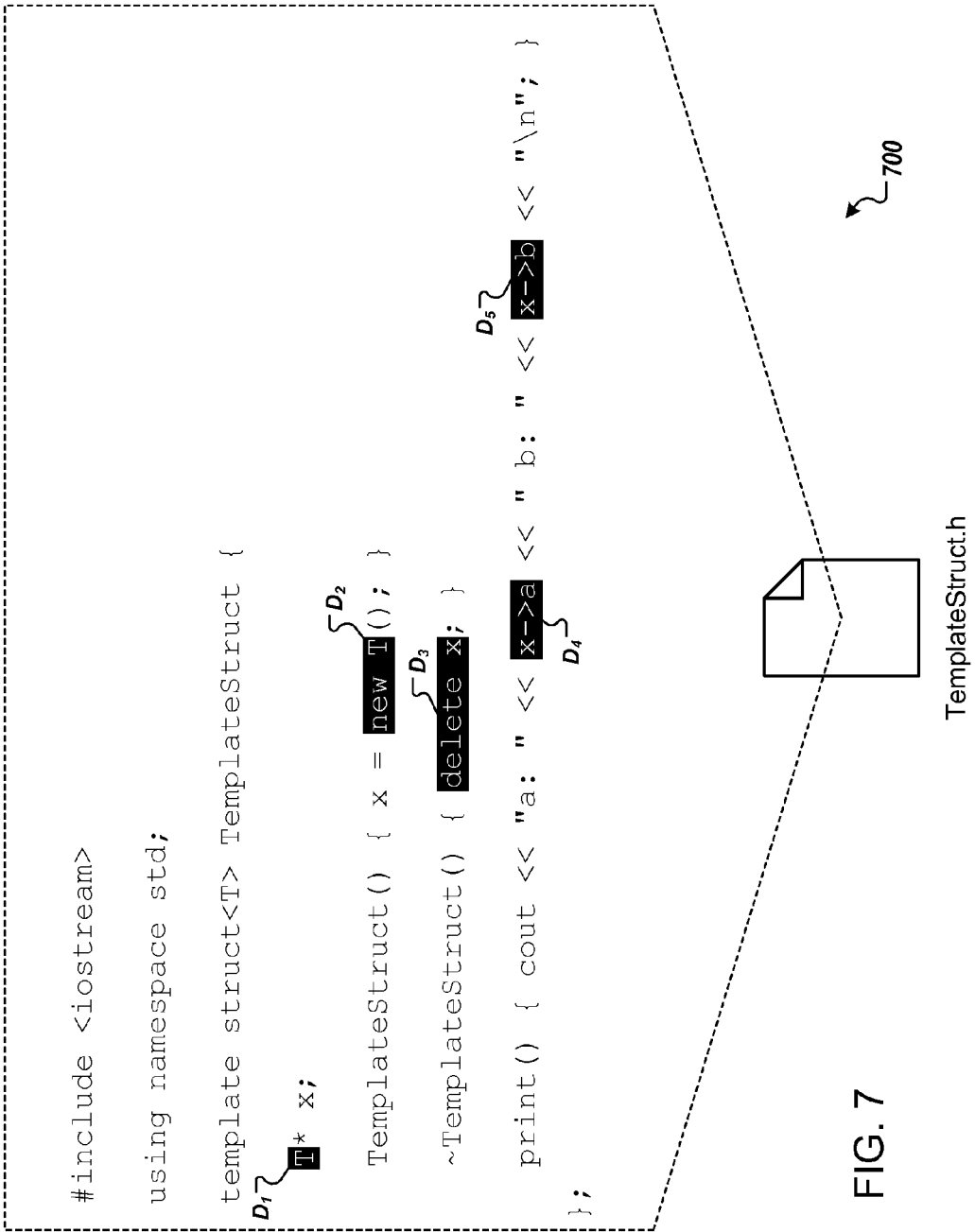
FIG. 7 illustrates example source code having a template definition.

FIG. 7 illustrates example source code 700 having a template definition. The source code 700 is contained in the source code file TemplateStruct.h. The source code 700 include a definition for a template structure.

As depicted in FIG. 7, the source code file TemplateStruct.h includes the following example source code:
    #include <iostream>
    using namespace std;
    template struct<T> TemplateStruct {
    T* x;
    TemplateStruct( ) {x=new T( );}
    ~TemplateStruct( ) {delete x;}
    print( ) {cout<<"a:"<<x→a<<"b:"<<x→b<<"\n";}
    };

As shown above and in FIG. 7, the template definition contained in TemplateStruct.h includes multiple references to a generic type parameter T. The multiple references in the template definition to the type parameter may result in multiple dependencies of the template definition on the type parameter, if not handled differently.

More specifically, the template definition represented by the source code 700 references the template parameter T five times. Where the template struct is invoked, these references can result in five corresponding dependencies on a software element defining the type T. A first dependency $D_1$ results from defining a pointer, x, to a variable having the type T. A second dependency $D_2$ results from in using the T constructor to allocate a new variable of type T. A third dependency $D_3$ results from the T struct destructor deallocating the variable of type T. A fourth $D_4$ results from accessing a member variable of the type T with x→a, and a fifth dependency $D_5$ also results from accessing a member variable of the type T using x→b.

The target of these dependencies, T, is an arbitrary parameter whose definition is contained in no software element of the code base.

Figure 8:
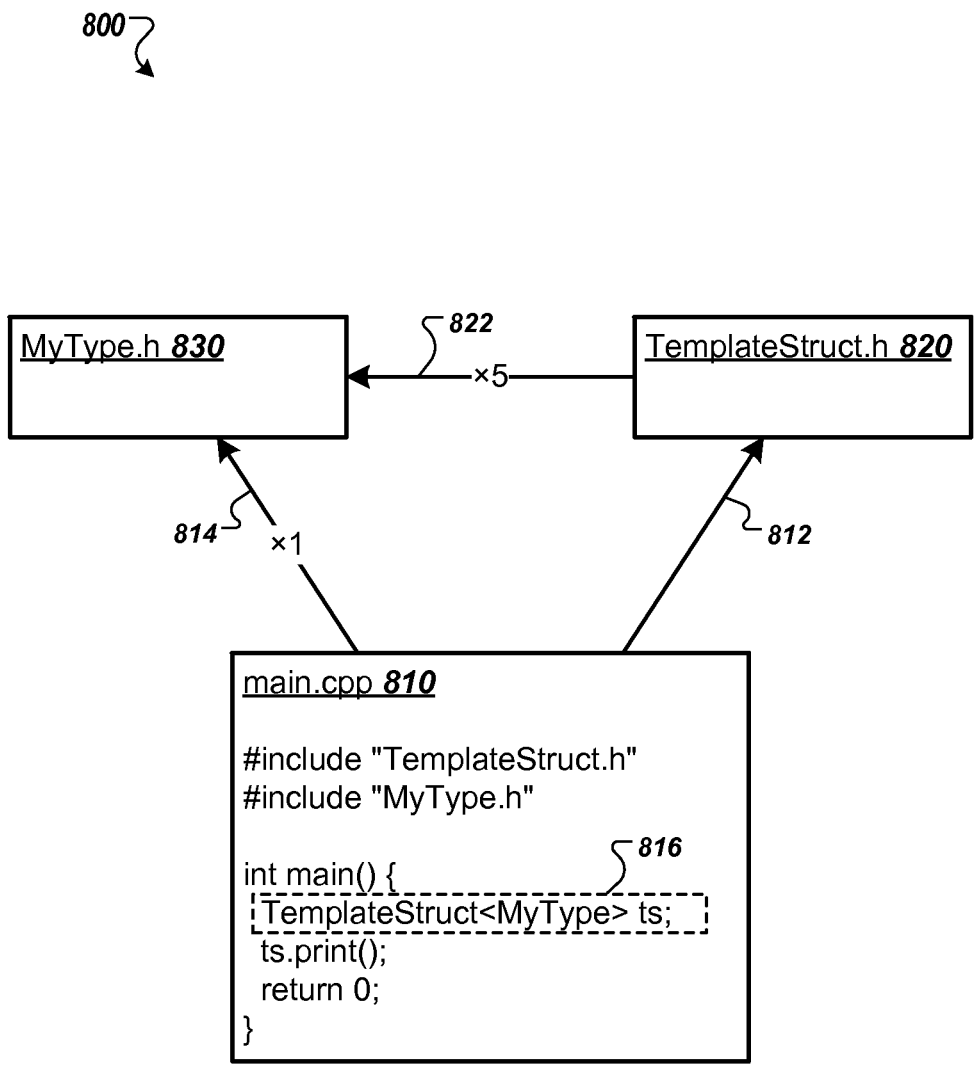
FIG. 8 illustrates an example aggregated dependency graph.

FIG. 8 illustrates an example aggregated dependency graph 800. The aggregated dependency graph 800 represents dependency relationships between source code files in a highly simplified example project that includes three source code files, main.cpp, TemplateStruct.h, and MyType.h, represented respectively by nodes 810, 820, and 830. In the example project of FIG. 8, TemplateStruct.h contains a definition of a template and MyType.h contains a definition of a user-defined type. The TemplateStruct.h source code file contains source code as described above in reference to FIG. 7. The main.cpp source code file includes the following source code:
    #include "TemplateStruct.h"
    #include "MyType.h"
    int main( ) {
    TemplateStruct<MyType> ts( );
    ts.print( );
    return 0;
    }

The source code of main.cpp references the types "MyType" and "TemplateStruct." Therefore, there are aggregated dependencies between the "main.cpp" node 810 and a "TemplateStruct.h" node 820 and a "MyType.h" node 830. Thus, software elements contained within main.cpp would have raw dependencies on software elements contained within TemplateStruct.h and MyType.h.

For simplicity, FIG. 8 illustrates aggregated dependencies between the source code files. However, the inlining process would typically be performed on raw dependencies rather than aggregated dependencies.

As shown in FIG. 7, the aggregated dependencies of the "main.cpp" node 810 on the "TemplateStruct.h" and "MyType.h" nodes 820 and 830 are represented by links 812 and 814, respectively.

The example aggregated dependency graph 800 includes indicia with each link representing the quantity of dependencies between the source code files, e.g., as described above with reference to FIG. 5. As shown in FIG. 8, link 814 has a count of one, representing a single dependency of the "main.cpp" node 810 on the "MyType.h" node 830.

The MyType.h source code file includes the following source code:
    struct MyType {
    int a,b;
    MyType( ) {a=0; b=0;}
    };

The file main.cpp includes a variable declaration 816 of a template defined by TemplateStruct.h with the type defined by MyType.h. In other words, the variable declaration 816 requests that the compiler create an instance of the template defined by TemplateStruct.h using the type "MyType" defined in MyType.h.

The resulting example aggregated dependency graph 800 represents that the "TemplateStruct.h" node 820 depends on the "MyType.h" node 830 with link 822. The link 822 represent each of the five dependencies $D_1$, $D_2$, $D_3$, $D_4$, and $D_5$. Thus, the link 822 has an associated count of 5. That is, the dependency graph 800 effectively treats the compile-time generated code as though it is located within the TemplateStruct.h source code file, even though TemplateStruct.h contains no source code that actually references MyType.h.

In some implementations, a static analysis system can address these issues by treating dependencies on type parameters referenced in template definitions as being dependencies from the usage of the template, e.g., in a variable declaration, to the definition of the type parameter used in the declaration. In the example of FIG. 7, the system can treat the five dependencies as being dependencies from the declaration of "ts" in main.cpp to the definition of the template parameter in MyType.h. This can be seen as effectively inlining an instance of the template defined by TemplateStruct.h with the type defined by MyType.h.

Figure 9:
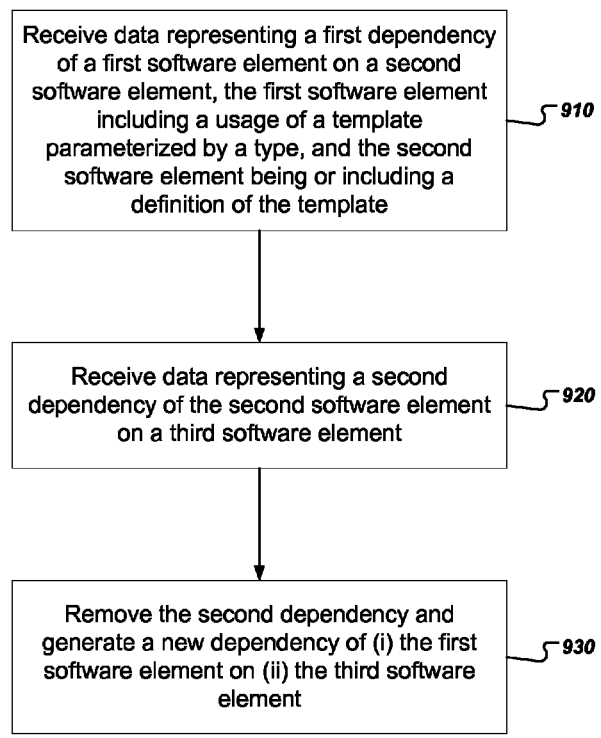
FIG. 9 is a flow chart of an example process for inlining dependencies between nodes in a dependency graph for a template project.

FIG. 9 is a flow chart of an example process for inlining dependencies between nodes in a dependency graph for a template project. The process will be described as operating on raw dependencies, but for ease of illustration, the accompanying figures will show the resulting aggregated dependencies. This process will be described as being performed by an appropriately programmed system of one or more computers, and be similar to or include that which has been described above in associated with FIG. 2.

The system receives data representing a first dependency of a first software element on a second software element, the first software element including a usage of a template parameterized by a type, and the second software element being or including a definition of the template (910). For example, the aggregated dependency graph 800 includes a first dependency 812 from main.cpp to TemplateStruct.h representing the variable declaration "TemplateStruct<MyType> ts;" using a template defined by TemplateStruct.h.

The system receives data representing a second dependency of the second software element on a third software element (920). For example, the aggregated dependency graph 800 includes a dependency 822 from TemplateStruct.h to MyType.h.

In response, the system removes the second dependency and generates a new dependency of (i) the first software element on (ii) the third software element (930). In some implementations, the system only inlines dependencies from the template definition to the software element involving the type used in the template parameter. In other words, if the template definition has any other dependencies, those dependencies are simply removed instead of being inlined. For example, the system can modify each of the five dependencies $D_1$, $D_2$, $D_3$, $D_4$, and $D_5$ to instead be dependencies from main.cpp to MyType.h. In doing so, the system can generate a more intuitive dependency graph for dependencies in the project.

In some implementations, the system reprocesses the newly generated dependencies in case a target of the new dependency is a different template definition. This can arise, for example, when using nested templates.

Figure 10:
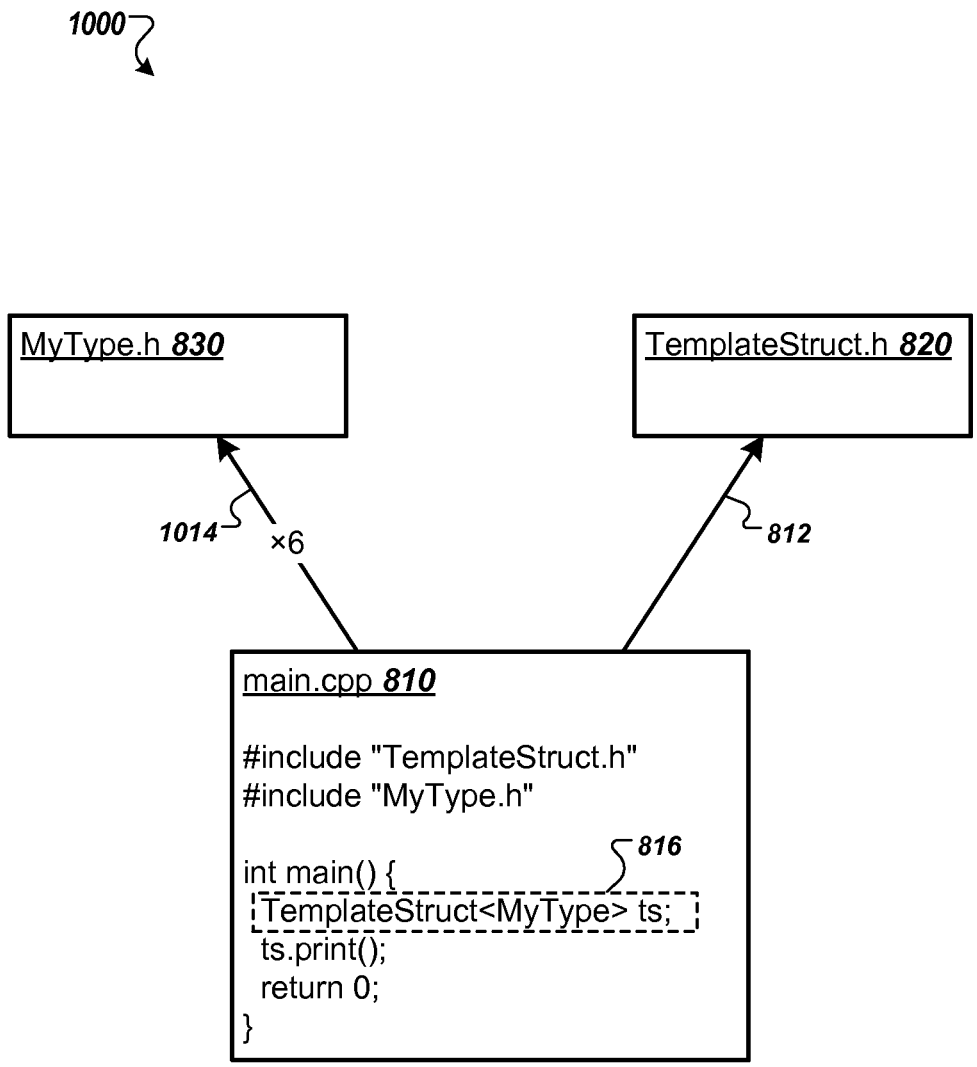
FIG. 10 illustrates an example inlined dependency graph.

FIG. 10 illustrates an example inlined dependency graph 1000. The inlined dependency graph 1000 represents an inlined version of the dependencies depicted in FIG. 8.

Unlike dependency graph 800, the inlined dependency graph 1000 does not include a link between the "TemplateStruct.h" node 820 and the "MyType.h" node 830. This link has been removed. The inlined dependency graph 1000 further differs from dependency graph 800 in that inlined dependency graph 1000 includes a link 1014 between the "main.cpp" node 810 and the "MyType.h" node 820 having an updated count of six dependencies. The updated count associated with link 1014 represents the generation of the five new dependencies represented by link 822 in dependency graph 800.

Figure 11:
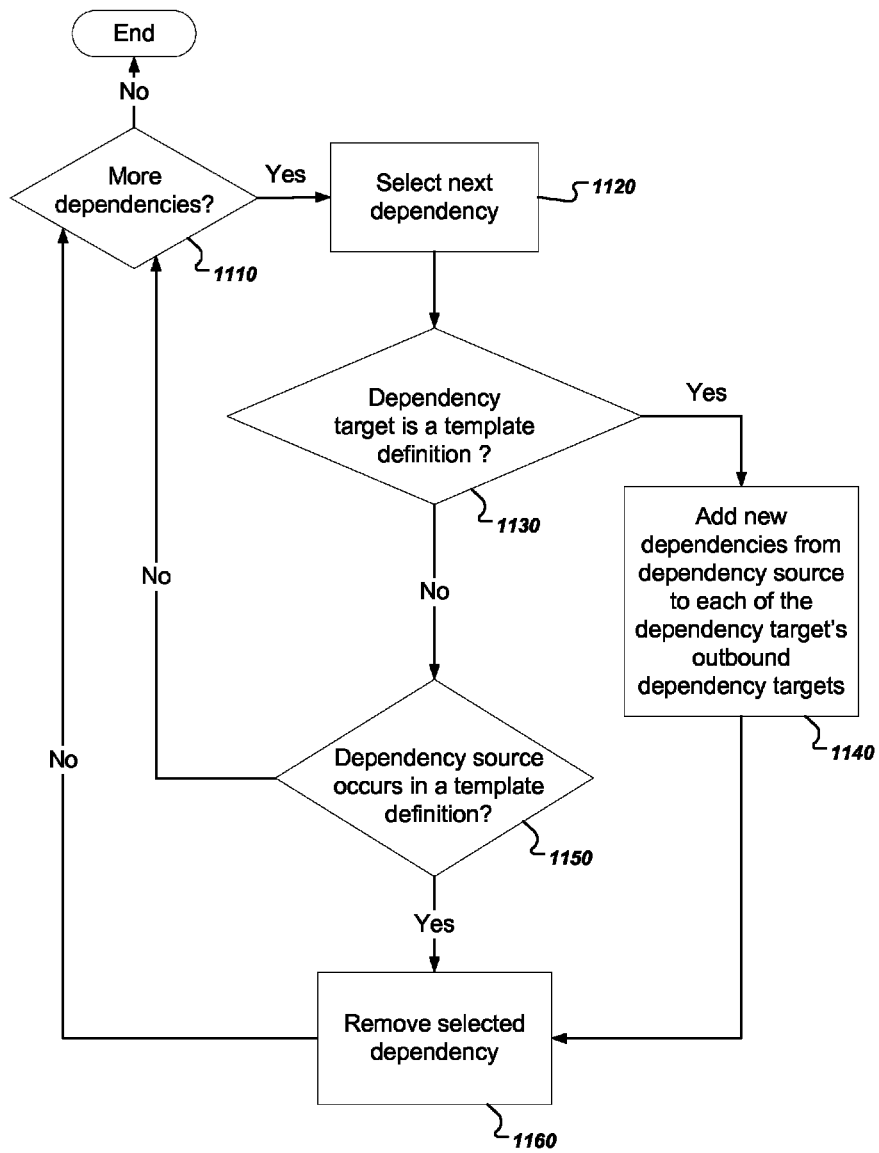
FIG. 11 is a flow chart of an example process for identifying and inlining dependencies.

FIG. 11 is a flow chart of an example process for identifying and inlining dependencies. The system can analyze links or data representing dependencies in a software project to identify usages of templates parameterized by types. the system can then inline dependencies induced by the identified declarations. Reference will be made to the example source code files described above with reference to FIGS. 8-10. The process will be described as being performed by an appropriately programmed system of one or more computers, such as that having been described above in association with FIG. 2.

The system determines whether any dependencies existing between software elements in a software project have yet to be analyzed (1110).

If there are more dependencies to analyze, the system selects the next dependency to be analyzed (1120). Otherwise, the example process ends (branch to end).

Upon selecting the next dependency, the system determines whether the target of the selected dependency is a template definition (1130).

If so, the system adds new dependencies from the dependency source to each of the dependency target's outbound dependency targets (branch to 1140).

For example, the system can determine that there is at least one dependency from TemplateStruct.h to another software element in the project, and the system can subsequently select one of the five type dependencies $D_1$, $D_2$, $D_3$, $D_4$, and $D_5$, represented in dependency graph 800 as link 822.

The system can optionally only add new dependencies if the target of a selected outbound dependency is a template parameter or occurs in a definition of a template parameter.

For example, the system can determine that the target of a selected one of the five type dependencies, the target being MyType.h, is the type parameter used by the template. This system can then add a new dependency for this dependency and discard the other four.

To account for nested templates, the system can add the newly generated dependencies to a queue of dependencies that remain to be processed by the process of FIG. 11.

The system then removes the selected dependency (1160), and again determines if there are more dependencies to be processed (branch to 1110).

If the target of the selected dependency was not a template definition (1130), the system determines whether the dependency source occurs in the template definition (1150). In other words, because the system is inlining dependencies, the system can find dependencies that originate in the template definition and remove them.

Thus, if so, the system removes the selected dependency (branch to 1160). If not, the system determines whether more dependencies remain to be processed (branch to 1110).

As an alternative to template inlining, the system can also generate a new node in a dependency graph that represents a template instantiation. The template instantiation node does not correspond to any particular source code file, but instead represents the compile-time generated code corresponding to the template instantiation. That is, in addition to using nodes to represent software elements of a code base, e.g. a node representing main.cpp, the system can also generate nodes representing compile-time instantiations of templates. In the example of FIG. 7, this may include treating the compile-time generated code for the variable declaration 816 included in main.cpp source code file as though it is code that is located in a separate source code file of the code base. The newly generated node may also have dependencies to other nodes in the dependency graph. In this way, a template instantiation is relocated within a dependency graph so as to correspond to its own specific node.

Figure 12:
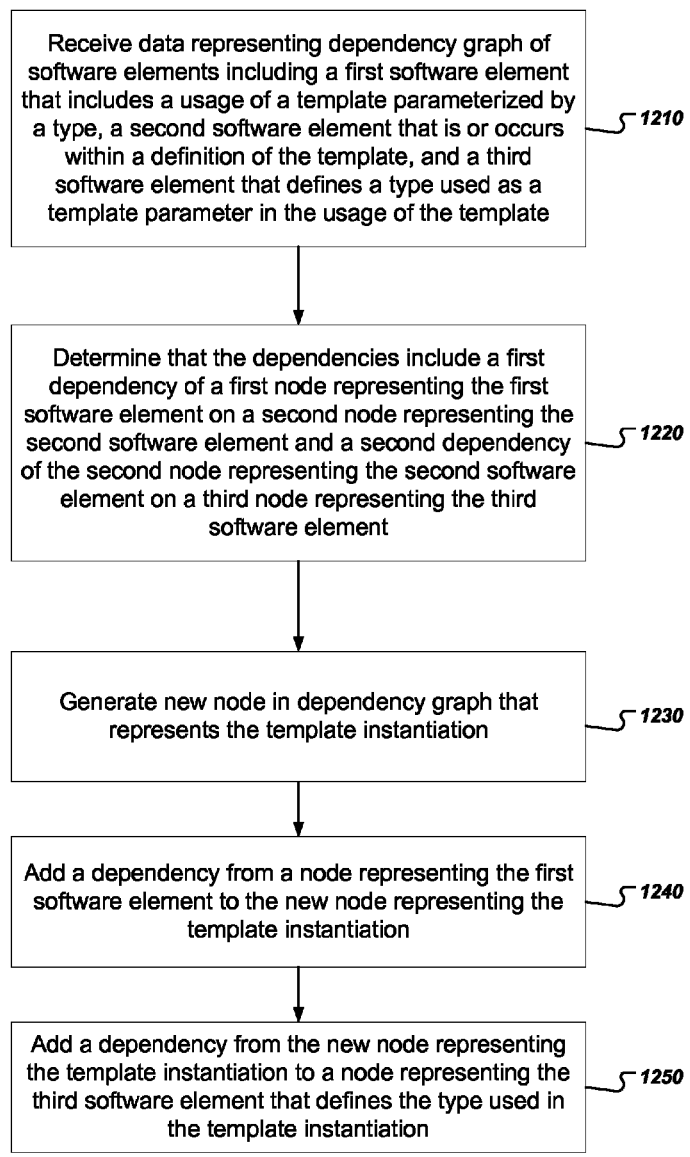
FIG. 12 is a flow chart of an example process for generating template instantiation nodes in a dependency graph for a template project.

FIG. 12 is a flow chart of an example process for generating template instantiation nodes in a dependency graph for a template project. This process will be described as being performed by an appropriately programmed system of one or more computers, and be similar to or include that which has been described above in associated with FIG. 2.

The system receives data representing a dependency graph of software elements including first software element that includes a usage of a template parameterized by a type and a second software element that is or occurs within a definition of the template, and a third software element that defines a type used as a template parameter in the usage of the template (1210). For example, in the dependency graph 800, main.cpp has a variable declaration using a template defined by TemplateStruct.h, represented by link 812 in FIG. 8. And TemplateStruct.h had a dependency on MyType.h that defined a type used in the variable declaration, as represented by link 822 in FIG. 8.

The system determines that the dependencies include a first dependency of a first node representing the first software element on a second node representing the second software element and a second dependency of the second node representing the second software element on a third node representing the third software element (1220). For example, the target of the second dependency between TemplateStruct.h and MyType.h was a software element defining a type used in the variable declaration of main.cpp.

In response, the system generates a new node in the dependency graph that represents an instance of the template instantiation (1230). For example, the system can generate a node in the dependency graph that represents the template instantiated by the variable declaration 816. In some implementations, generating the new template instantiation node in the dependency graph includes generating a new node in the dependency graph that does not occur in the hierarchy of software elements.

The system adds a dependency from a node representing the first software element to the new node representing the template instantiation (1240). For example, the system can generate a link between the "main.cpp" node 810 and the new node representing the template instantiation 816.

The system adds a dependency from the new node representing the template instantiation to a node representing the third software element that defines the type used in the template instantiation (1250).

Figure 13:
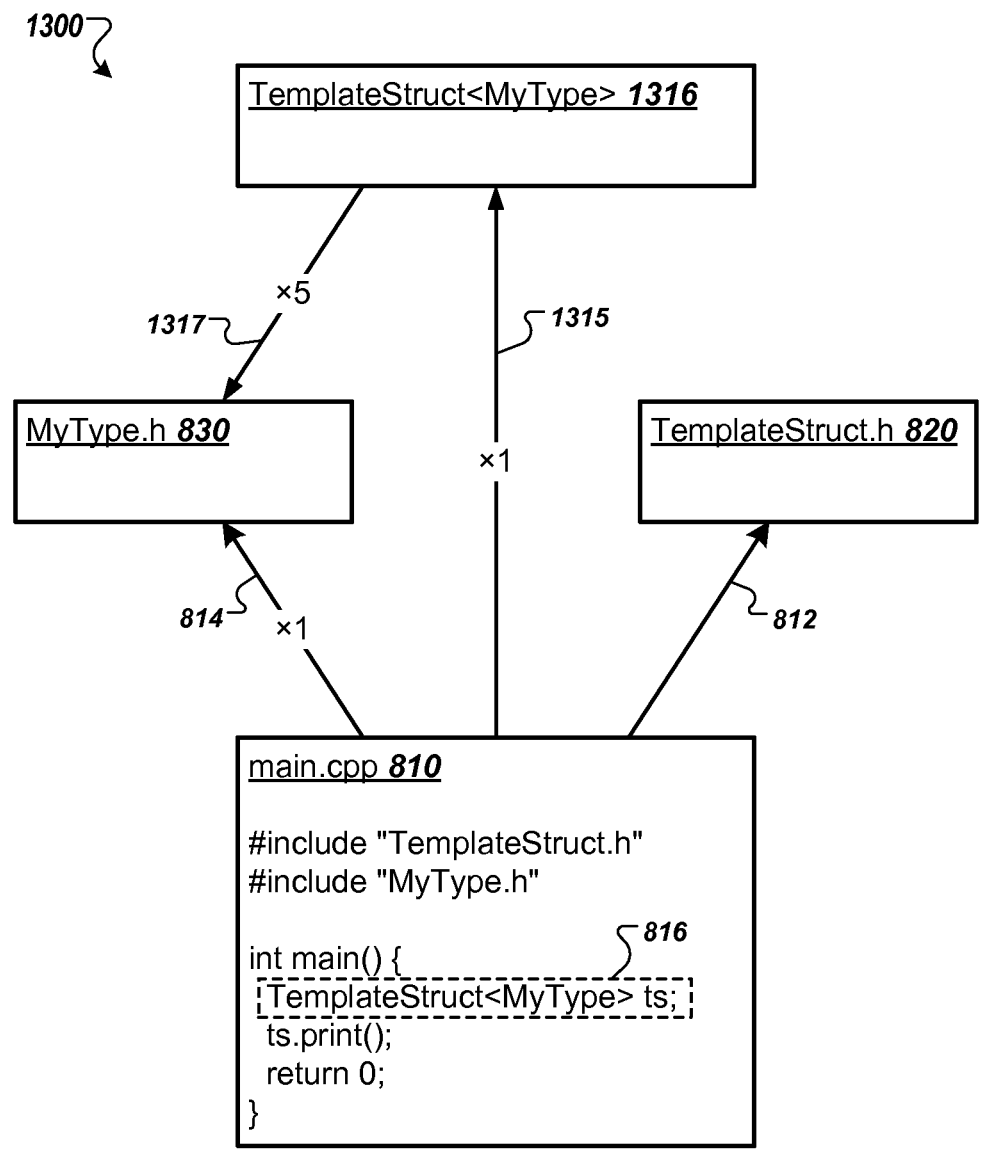
FIG. 13 illustrates a dependency graph having a new node representing a template instantiation.

FIG. 13 illustrates a dependency graph 1300 having a new node 1316 representing a template instantiation. The dependency graph 1300 represents dependencies depicted in FIG. 8 after being modified using the techniques described in association with FIG. 12.

Unlike dependency graph 800, the dependency graph 1300 shown in FIG. 13 does not include a link 822 between the "TemplateStruct.h" and "MyType.h" nodes 820 and 830. The dependency graph 1300 further differs from dependency graph 800 in that dependency graph 1300 further includes a "TemplateStruct<MyType>" node 1316. In some implementations, the "TemplateStruct<MyType>" node 1316 represents all instantiations in the project of the template defined by TemplateStruct.h with the type defined by MyType.h.

The dependency graph 1300 includes a link 1315 of the "main.cpp" node 820 on the "TemplateStruct<MyType>" node 1316 accompanied by a count representing one dependency. The dependency graph 1300 also includes a link 1317 of the "TemplateStruct<MyType>" node 1316 on the "MyType.h" node 830, accompanied by a count representing five dependencies.

In some implementations, the process of generating the dependency graph 1300 includes updating the dependency graph 800. In one aspect, the process of generating the dependency graph 1300 includes updating dependency graph 800 to reflect removal of link 822. The updates made to dependency graph 800 can include the addition of newly-generated node 1316, the link 1315 representing a dependency from the "main.cpp" node 810 to the newly-generated node 1316, and the link 1317 representing a dependency from the newly-generated node 1316 to the "MyType.h" node 830.

FIG. 14 is a flow chart of an example process for generating template instantiation nodes. The process will be described as being performed by an appropriately programmed system of one or more computers, such as that having been described above in association with FIG. 2.

The system determines whether any dependencies between software elements in a project have yet to be analyzed (1410).

If the system determines that there are more dependencies to analyze, the system selects the next dependency to be analyzed (branch to 1420). Otherwise, the example process ends (branch to end).

Upon selecting the next dependency, the system determines whether the dependency target is a template definition (1430). If so, the system determines whether a node that represents an instantiation of the template already occurs in a corresponding dependency graph (1440). If the node does not exist, the system generates a new node in the dependency graph that represents the template instantiation (branch to 1442).

After generating a new template instantiation node in the dependency graph (1442) or in response to determining that a template node representing the template instantiation is already included in the dependency graph (1440), the system adds a dependency from the node that represents the respective source to the template node (1450). The system adds a dependency to the dependency graph from the template node to the node that represents the type (1460). For example, the system can add links 1315 and 1317 to the dependency graph 1300.

The system then removes the selected dependency (1470). For example, the system can remove the dependency represented by link 822 as shown in FIG. 8.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving data representing a dependency graph of a project, wherein the dependency graph has nodes representing a plurality of software elements, including a first software element that includes a usage of a template parameterized by a type, a second software element that is or occurs within a definition of the template, and a third software element that defines the type used as the template parameter in the usage of the template, wherein the first software element, the second software element, and the third software element are distinct from each other,
   wherein the dependency graph has edges representing dependencies between pairs of nodes, each edge between a pair of nodes representing a dependency of a first node of the pair on a second node of the pair, and
   wherein the dependency graph includes nodes that correspond to software elements represented in a hierarchy of software elements;
   determining that the dependencies include a first dependency of a first node representing the first software element on a second node representing the second software element, and a second dependency of the second node representing second software element on a third node representing the third software element; and
   in response, modifying the dependency graph including:
      generating a new node in the dependency graph, the new node representing an instantiation of the template with the type, wherein the new node does not correspond to a software element represented in the hierarchy of software elements,
      adding a new first dependency from the first node to the new node, and
      adding a new second dependency from the new node to the third node.

2. The method of claim 1, further comprising removing the second dependency from the dependency graph.

3. The method of claim 1, wherein generating the new node in the dependency graph comprises:
   generating a new node in the dependency graph that represents all instantiations of the template with the type in the project.

4. The method of claim 1, wherein the hierarchy of software elements includes nodes that represent respective file system constructs.

5. The method of claim 1, wherein modifying the dependency graph further comprises:
   updating a graphical representation of dependencies between software elements in the project to reflect (i) the new node, (ii) the first dependency from the first node to the new node, and (iii) the second dependency from the new node to the third node.

6. The method of claim 1, wherein modifying the dependency graph further comprises:
   removing the second dependency from the dependency graph; and
   updating a graphical representation of dependencies between software elements in the project to reflect removal of the second dependency of the second node representing the second software element on the third node representing the third software element.

7. The method of claim 1, comprising:
   generating a graphical representation of the dependency graph.

8. The method of claim 1, wherein the template is a software element that is parameterized by type at compile-time.

9. The method of claim 1, wherein a target of the second dependency is referenced as a parameter of a variable declaration using the template in the first software element.

10. The method of claim 1, wherein the third software element is not referenced in the definition of the template in the second software element.

11. A system comprising:
    one or more computers and one or more storage devices storing instructions that are operable, when executed by the one or more computers, to cause the one or more computers to perform operations comprising:
    receiving data representing a dependency graph of a project, wherein the dependency graph has nodes representing a plurality of software elements, including a first software element that includes a usage of a template parameterized by a type, a second software element that is or occurs within a definition of the template, and a third software element that defines the type used as the template parameter in the usage of the template, wherein the first software element, the second software element, and the third software element are distinct from each other,
    wherein the dependency graph has edges representing dependencies between pairs of nodes, each edge between a pair of nodes representing a dependency of a first node of the pair on a second node of the pair, and
    wherein the dependency graph includes nodes that correspond to software elements represented in a hierarchy of software elements;
    determining that the dependencies include a first dependency of a first node representing the first software element on a second node representing the second software element, and a second dependency of the second node representing second software element on a third node representing the third software element; and
    in response, modifying the dependency graph including:
       generating a new node in the dependency graph, the new node representing an instantiation of the template with the type, wherein the new node does not correspond to a software element represented in the hierarchy of software elements,
       adding a new first dependency from the first node to the new node, and
       adding a new second dependency from the new node to the third node.

12. The system of claim 11, wherein the operations further comprise removing the second dependency from the dependency graph.

13. The system of claim 11, wherein generating the new node in the dependency graph comprises:
    generating a new node in the dependency graph that represents all instantiations of the template with the type in the project.

14. The system of claim 11, wherein the hierarchy of software elements includes nodes that represent respective file system constructs.

15. The system of claim 11, wherein modifying the dependency graph further comprises:
updating a graphical representation of dependencies between software elements in the project to reflect (i) the new node, (ii) the first dependency from the first node to the new node, and (iii) the second dependency from the new node to the third node.

16. The system of claim 11, wherein modifying the dependency graph further comprises:
removing the second dependency from the dependency graph; and
updating a graphical representation of dependencies between software elements in the project to reflect removal of the second dependency of the second node representing second software element on the third node representing the third software element.

17. The system of claim 11, wherein the operations further comprise:
generating a graphical representation of the dependency graph.

18. The system of claim 11, wherein the template is a software element that is parameterized by type at compile-time.

19. The system of claim 11, wherein a target of the second dependency is referenced as a parameter of a variable declaration using the template in the first software element.

20. The system of claim 11, wherein the third software element is not referenced in the definition of the template in the second software element.

21. A computer program product, encoded on one or more non-transitory computer storage media, comprising instructions that when executed by one or more computers cause the one or more computers to perform operations comprising:
receiving data representing a dependency graph of a project, wherein the dependency graph has nodes representing a plurality of software elements, including a first software element that includes a usage of a template parameterized by a type, a second software element that is or occurs within a definition of the template, and a third software element that defines the type used as the template parameter in the usage of the template, wherein the first software element, the second software element, and the third software element are distinct from each other,
wherein the dependency graph has edges representing dependencies between pairs of nodes, each edge between a pair of nodes representing a dependency of a first node of the pair on a second node of the pair, and
wherein the dependency graph includes nodes that correspond to software elements represented in a hierarchy of software elements;
determining that the dependencies include a first dependency of a first node representing the first software element on a second node representing the second software element, and a second dependency of the second node representing second software element on a third node representing the third software element; and
in response, modifying the dependency graph including:
generating a new node in the dependency graph, the new node representing an instantiation of the template with the type, wherein the new node does not correspond to a software element represented in the hierarchy of software elements,
adding a new first dependency from the first node to the new node, and
adding a new second dependency from the new node to the third node.

22. The computer program product of claim 21, wherein the operations further comprise removing the second dependency from the dependency graph.

23. The computer program product of claim 21, wherein generating the new node in the dependency graph comprises:
generating a new node in the dependency graph that represents all instantiations of the template with the type in the project.

24. The computer program product of claim 21, wherein the hierarchy of software elements includes nodes that represent respective file system constructs.

25. The computer program product of claim 21, wherein modifying the dependency graph further comprises:
updating a graphical representation of dependencies between software elements in the project to reflect (i) the new node, (ii) the first dependency from the first node to the new node, and (iii) the second dependency from the new node to the third node.

26. The computer program product of claim 24, wherein modifying the dependency graph further comprises:
removing the second dependency from the dependency graph; and
updating a graphical representation to of dependencies between software elements in the project reflect removal of the second dependency of the second node representing second software element on the third node representing the third software element.

27. The computer program product of claim 21, wherein the operations further comprise:
generating a graphical representation of the dependency graph.

28. The computer program product of claim 21, wherein the template is a software element that is parameterized by type at compile-time.

29. The computer program product of claim 21, wherein a target of the second dependency is referenced as a parameter of a variable declaration using the template in the first software element.

30. The computer program product of claim 21, wherein the third software element is not referenced in the definition of the template in the second software element.

* * * * *